(12) United States Patent
Sakajo et al.

(10) Patent No.: US 9,908,381 B2
(45) Date of Patent: Mar. 6, 2018

(54) VEHICLE CONTROL APPARATUS AND VEHICLE CONTROL METHOD

(75) Inventors: Yuichi Sakajo, Toyohashi (JP); Keigo Suematsu, Toyota (JP); Yoshiaki Naganuma, Toyota (JP); Masanori Uehara, Kariya (JP); Takashi Koyama, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/515,402

(22) PCT Filed: Aug. 25, 2010

(86) PCT No.: PCT/JP2010/064855
§ 371 (c)(1),
(2), (4) Date: Jun. 12, 2012

(87) PCT Pub. No.: WO2011/074293
PCT Pub. Date: Jun. 23, 2011

(65) Prior Publication Data
US 2012/0247746 A1    Oct. 4, 2012

(30) Foreign Application Priority Data
Dec. 14, 2009 (JP) .................... 2009-282684

(51) Int. Cl.
*H01M 8/00* (2016.01)
*B60H 1/00* (2006.01)
(Continued)

(52) U.S. Cl.
CPC .......... *B60H 1/00392* (2013.01); *B60H 1/03* (2013.01); *H01M 8/04007* (2013.01);
(Continued)

(58) Field of Classification Search
CPC ......... H01M 8/04007; H01M 8/04701; H01M 8/04716; H01M 8/04223; H01M 8/04268; H01M 2250/20
(Continued)

(56) References Cited

U.S. PATENT DOCUMENTS 3,618,854 A * 11/1971 Frank .................... B60H 1/025
165/287
2003/0217559 A1 11/2003 Ieda et al.
(Continued)

FOREIGN PATENT DOCUMENTS

DE      197 30 678 A1    1/1999
JP      A-2001-315524    11/2001
(Continued)

OTHER PUBLICATIONS

Karim Nice "How Car Cooling Systems Work" Nov. 22, 2000, HowStuffWorks.com. <http://auto.howstuffworks.com/cooling-systems.htm> Feb. 10, 2016.*
(Continued)

*Primary Examiner* — Jimmy K Vo
(74) *Attorney, Agent, or Firm* — Oliff PLC

(57) ABSTRACT

The vehicle control apparatus configured to control a vehicle includes a fuel cell configured to supply electric power to the vehicle; an air conditioning mechanism having a heater core; a first medium circuit; a radiator installed in the first medium circuit; a bypass circuit formed in the first medium circuit to make a bypass flow of the cooling medium bypassing the radiator; a regulation valve installed in the first medium circuit to regulate a ratio of a flow rate of the cooling medium going through the radiator to a flow rate of the cooling medium going through the bypass circuit; a second medium circuit; a cooling medium circulation pump installed in at least one of the first medium circuit and the second medium circuit; a temperature acquisition module; a warm-up controller; and a state switchover structure.

8 Claims, 9 Drawing Sheets

(51) Int. Cl.
  *B60H 1/03* (2006.01)
  *H01M 8/04007* (2016.01)
  *H01M 8/04701* (2016.01)
(52) U.S. Cl.
  CPC .... *H01M 8/04701* (2013.01); *H01M 2250/20* (2013.01); *H01M 2250/405* (2013.01); *Y02B 90/16* (2013.01); *Y02T 90/32* (2013.01)
(58) Field of Classification Search
  USPC ....... 429/440, 428, 434, 435, 433, 442, 437, 429/439; 165/51, 202, 296; 700/299, 700/300, 301
  See application file for complete search history.

(56) References Cited

U.S. PATENT DOCUMENTS

| | | |
|---|---|---|
| 2004/0050944 A1 | 3/2004 | Matsunaga et al. |
| 2009/0130513 A1 | 5/2009 | Tsuchiya et al. |
| 2009/0148727 A1* | 6/2009 | Taniguchi ......... H01M 8/04007 429/430 |
| 2009/0283604 A1 | 11/2009 | Martinchick et al. |

FOREIGN PATENT DOCUMENTS

| | | |
|---|---|---|
| JP | A-2005-263200 | 9/2005 |
| JP | A-2007-038952 | 2/2007 |
| JP | A-2008-094207 | 4/2008 |
| JP | A-2009-113539 | 5/2009 |
| JP | A-2009-158399 | 7/2009 |

OTHER PUBLICATIONS

Oct. 25, 2010 Written Opinion of the International Searching Authority issued in International Patent Application No. PCT/JP2010/064855.

Feb. 27, 2012 International Preliminary Report on Patentability issued in International Patent Application No. PCT/JP2010/064855.

Oct. 25, 2010 International Search Report issued in International Patent Application No. PCT/JP2010/064855.

* cited by examiner

VEHICLE CONTROL APPARATUS AND VEHICLE CONTROL METHOD

TECHNICAL FIELD

The present invention relates to a technique of utilizing the waste heat of fuel cells for air conditioning.

BACKGROUND ART

In a vehicle equipped with fuel cells as an electric power source, several control devices (systems) have been proposed to utilize the waste heat of the fuel cells for heating in air conditioning equipment. One proposed system includes a circuit for making a circulated flow of a cooling medium between the fuel cells and a radiator (for the convenience sake, this circuit is referred to as 'cooling circuit' in the following explanation) and a circuit for making a circulated flow of the cooling medium through a heater core used for heating (for the convenience sake, this circuit is referred to as 'heating circuit' in the following explanation). When the temperature of the fuel cells is within a specific temperature range with a high power generation efficiency of the fuel cells (for example, a temperature range of 72° C. to 80° C., hereafter referred to as 'high efficiency temperature range'), this prior art system interconnects and links these two circuits to utilize the waste heat of the fuel cells for heating up the heater core via the circulated flow of the cooling medium. Another proposed system warms up the fuel cells in a low temperature environment, until the temperature of the fuel cells reaches the high efficiency temperature range.

The technique of interconnecting and linking the cooling circuit and the heating circuit in the state where the temperature of the fuel cells is within the high efficiency temperature range may be combined with the technique of warming up the fuel cells until the temperature of the fuel cells reaches the high efficiency temperature range. In this case, the waste heat of the fuel cells can not be utilized until the temperature of the fuel cells reaches the high efficiency temperature range. In response to the user's heating request given prior to an increase of the temperature of the fuel cells to the high efficiency temperature range, a different heating element, such as an electric heater, provided separately from the heater core should be activated to heat up the cooling medium flowing in the heating circuit. The electric power consumed by the electric heater is supplied from the fuel cells. Namely the fuel cells are required to generate the electric power that is to be supplied to the electric heater. This undesirably worsens the overall fuel consumption of the control device for the vehicle.

The prior art system allows flow interconnection and linkage of the cooling circuit and the heating circuit under a higher temperature condition than a warm-up termination temperature (a final temperature of the fuel cells attained by the warm-up). The temperature of the cooling medium in the heating circuit is generally lower than the temperature of the cooling medium in the cooling circuit in the state before the linkage of the heating circuit with the cooling circuit. The linkage of these two circuits causes a relatively low-temperature flow of the cooling medium to be flowed from the heating circuit into the cooling circuit. The temperature of the fuel cells may thus be decreased to be lower than the warm-up termination temperature. This damages the effectiveness of the warm-up and requires the use of the different heating element, such as the electric heater, to heat up the flow of the cooling medium in the state after the linkage of the heating circuit with the cooling circuit. This undesirably worsens the overall fuel consumption of the control device for the vehicle.

DISCLOSURE OF THE INVENTION

There would thus be a requirement for utilizing the waste heat of fuel cells to heat up a heater core. There would also be a requirement for improving the overall fuel consumption of a vehicle control device that is configured to control a vehicle and warm up fuel cells.

The present invention accomplishes at least part of the requirement mentioned above and the other relevant requirements by any of various aspects and applications discussed below.

One aspect of the invention is thus directed to a vehicle control apparatus for controlling a vehicle. The vehicle control apparatus comprises: a fuel cell configured to supply electric power to the vehicle; an air conditioning mechanism having a heater core; a first medium circuit configured to make a circulated flow of a cooling medium going through the fuel cell; a radiator installed in the first medium circuit; a bypass circuit formed in the first medium circuit to make a bypass flow of the cooling medium bypassing the radiator; a regulation valve installed in the first medium circuit to regulate a ratio of a flow rate of the cooling medium going through the radiator to a flow rate of the cooling medium going through the bypass circuit; a second medium circuit configured to make a circulated flow of the cooling medium going through the heater core; a cooling medium circulation pump installed in at least one of the first medium circuit and the second medium circuit; a temperature acquisition module configured to obtain a fuel cell temperature representing a representative temperature of the fuel cell; a warm-up controller configured to warm up the fuel cell until the fuel cell temperature reaches a warm-up termination temperature; and a state switchover structure configured to, when the fuel cell temperature is lower than a linkage state temperature that is lower than the warm-up termination temperature, set the first medium circuit and the second medium circuit in an independent state where the first medium circuit and the second medium circuit are separated from each other, and when the fuel cell temperature is not lower than the linkage state temperature, set the first medium circuit and the second medium circuit in a linkage state where the first medium circuit and the second medium circuit are interconnected and linked.

In the vehicle control apparatus according to this aspect of the invention, the linkage state temperature is set to be lower than the warm-up termination temperature. Such temperature setting enables the first medium circuit and the second medium circuit to be interconnected and linked at an earlier timing on the occasion of requiring a specifically large amount of heat to be supplied to the air conditioning mechanism, for example, at the time of a start of the vehicle. Namely the waste heat of the fuel cell can effectively be utilized for heating up the heater core. This arrangement desirably restricts the use of a different heating element, such as an electric heater, for heating up the flow of the cooling medium supplied to the heater core and decreases a required amount of electric power to be generated by the fuel cell and to be supplied to the different heating element, such as the electric heater, thus improving the overall fuel consumption of the vehicle control apparatus. In the vehicle control apparatus according to this aspect of the invention, the first medium circuit and the second medium circuit are interconnected and linked prior to termination of warm-up.

This arrangement effectively prevents a relatively low-temperature flow of the cooling medium circulated in the second medium circuit from flowing into the first medium circuit after termination of the warm-up and damaging the effectiveness of the warm-up. The linkage of the first medium circuit and the second medium circuit at this timing also restricts the use of the different heating element, such as the electric heater, for heating up the relatively low-temperature flow of the cooling medium in the first medium circuit. The terminology 'warm-up termination temperature' in the description hereof means both a temperature at which the warm-up controller terminates the warm-up and a final temperature of the fuel cell attained by the warm-up (an eventually increased temperature of the fuel cell when there is a further temperature increase of the fuel cell by the circulated flow of the cooling medium even after termination of the warm-up).

In one preferable application of the vehicle control apparatus according to the above aspect of the invention, the linkage state temperature is not lower than a lower limit temperature of a stable operation temperature range where the fuel cell is operable in a stable condition.

In the vehicle control apparatus of this application, the first medium circuit and the second medium circuit are interconnected and linked at a temperature of at the minimum not lower than the lower limit temperature of the stable operation temperature range. The temperature of the cooling medium flowing in the second medium circuit is generally lower than the temperature of the cooling medium flowing in the first medium circuit in the state before the linkage of the first medium circuit and the second medium circuit. The linkage of the two medium circuits decreases the temperature of the cooling medium flowing in the first medium circuit and thereby lowers the fuel cell temperature. Even in this case, the linkage state temperature is still not lower than the lower limit temperature of the stable operation temperature range, so that the fuel cell is operated in the stable condition even after the linkage of these two medium circuits. The state of the fuel cell operated in the stable condition represents a state having no extreme drop of at least one cell voltage in the fuel cell (for example, no voltage drop down to 0 V). In general, the lower limit temperature of the stable operation temperature range is lower than the warm-up termination temperature.

In another preferable application of the vehicle control apparatus according to the above aspect of the invention, the linkage state temperature is not lower than a lower limit temperature of a durable temperature range where the fuel cell maintains a predetermined durability performance.

In the vehicle control apparatus of this application, the first medium circuit and the second medium circuit are interconnected and linked at a temperature of at the minimum not lower than the lower limit temperature of the durable temperature range. This arrangement effectively prevents the durability performance of the fuel cell from abruptly deteriorating even after the linkage of these two medium circuits. The durable temperature range is generally included in the stable operation temperature range. In general, the lower limit temperature of the durable temperature range is lower than the warm-up termination temperature.

In still another preferable application of the vehicle control apparatus according to the above aspect of the invention. The vehicle control apparatus in accordance with claim 1, wherein the linkage state temperature is not lower than 0° C.

In the vehicle control device of this application, the first medium circuit and the second medium circuit are interconnected and linked under a lower temperature condition. This arrangement enables the waste heat of the fuel cell to be utilized for heating up the heater core at an earlier timing, for example, at the time of a start of the vehicle control apparatus, thus improving the overall fuel consumption of the vehicle control apparatus. Setting the linkage state temperature to be not lower than 0° C. prevents the generated water from being frozen inside the fuel cell after the linkage of the two medium circuits. Such temperature setting accordingly prevents the interference of the water freezing with the smooth supplies of the reactive gases and the smooth discharge of the generated water. The warm-up termination temperature is generally higher than 0° C.

In one preferable embodiment of the invention, the vehicle control apparatus of the above aspect further comprises: a heat value demand acquisition module configured to obtain a heat value demand or a required amount of heat generation for the air conditioning mechanism; a power generation amount acquisition module configured to obtain an amount of power generation by the fuel cell; a temperature regulation module configured to control the regulation valve and adjust a temperature of the cooling medium flowing through the first medium circuit, so as to regulate the fuel cell temperature; a target temperature setting module configured to set a target temperature for regulation of the fuel cell temperature by the temperature regulation module; and a below-demand temperature range specification module configured to identify presence or absence of a below-demand temperature range, which is a specific temperature range of the fuel cell temperature where a heat value or an amount of heat generation by the fuel cell at the obtained amount of power generation is not higher than the heat value demand, and, upon identification of the presence, specify the below-demand temperature range. Upon identification of the presence of the below-demand temperature range, the target temperature setting module sets an upper limit temperature of the specified below-demand temperature range to the target temperature.

In the vehicle control apparatus according to this embodiment of the invention, the upper limit temperature of the below-demand temperature range is set to the target temperature. Such temperature setting enables the fuel cell to generate a minimum amount of heat required for satisfying the heat value demand. This arrangement desirably prevents the fuel cell from generating an excess amount of heat or a higher heat value than the heat value demand. Namely this arrangement minimizes a decrease of the power generation efficiency of the fuel cell and thereby improves the fuel consumption of the fuel cell.

In one preferable application of the vehicle control apparatus having the configuration of the above embodiment, when the upper limit temperature of the below-demand temperature range is higher than an upper limit temperature of a stable operation temperature range where the fuel cell is operable in a stable condition, the target temperature setting module sets the upper limit temperature of the stable operation temperature range to the target temperature, in place of the upper limit temperature of the below-demand temperature range.

In this application of the vehicle control apparatus according to the above embodiment, the target temperature is set to the temperature in the stable operation temperature range. Such temperature setting assures the output stability of the fuel cell. The vehicle control apparatus of this application allows a higher temperature to be set to the target temperature and thereby effectively prevents the release of heat from the cooling medium before the fuel cell temperature reaches the target temperature. This arrangement assures the effective use of the waste heat of the fuel cell, thus improving the overall fuel consumption of the vehicle control apparatus.

In another preferable application of the vehicle control apparatus having the configuration of the above embodiment, upon identification of the absence of the below-demand temperature range by the below-demand temperature range specification module, the target temperature setting module sets an upper limit temperature of a stable operation temperature range where the fuel cell is operable in a stable condition, to the target temperature.

In this application of the vehicle control apparatus according to the above embodiment, the target temperature is set to the temperature in the stable operation temperature range. Such temperature setting assures the output stability of the fuel cell. The vehicle control apparatus of this application allows a higher temperature to be set to the target temperature and thereby effectively prevents the release of heat from the cooling medium before the fuel cell temperature reaches the target temperature. This arrangement assures the effective use of the waste heat of the fuel cell, thus improving the overall fuel consumption of the vehicle control apparatus.

In still another preferable application of the vehicle control apparatus having the configuration of the above embodiment, the temperature regulation module restricts heat release during a rise of the fuel cell temperature until the fuel cell temperature reaches the target temperature.

This application of the vehicle control device according to the above embodiment prevents the release of heat before the fuel cell temperature reaches the target temperature and thereby enables the waste heat of the fuel cell to be accumulated in the flow of the cooling medium until the fuel cell temperature reaches the target temperature. In response to the user's heating request for a higher temperature, the heat accumulated in the flow of the cooling medium can be used to heat up the heater core. This arrangement allows for a quick response to the user's heating request and improves the overall fuel consumption of the vehicle control apparatus.

Another aspect of the invention is directed to a method of controlling a vehicle. The vehicle includes: a fuel cell configured to supply electric power to the vehicle; an air conditioning mechanism having a heater core; a first medium circuit configured to make a circulated flow of a cooling medium going through the fuel cell; a radiator installed in the first medium circuit; a bypass circuit formed in the first medium circuit to make a bypass flow of the cooling medium bypassing the radiator; and a second medium circuit configured to make a circulated flow of the cooling medium going through the heater core. The method regulates a ratio of a flow rate of the cooling medium going through the radiator to a flow rate of the cooling medium going through the bypass circuit and adjusting a temperature of the cooling medium flowing through the first medium circuit, so as to regulate a fuel cell temperature representing a representative temperature of the fuel cell. The method also warms up the fuel cell until the fuel cell temperature reaches a warm-up termination temperature. The method obtains the fuel cell temperature. When the fuel cell temperature is lower than a linkage state temperature that is lower than the warm-up termination temperature, the method sets the first medium circuit and the second medium circuit in an independent state where the first medium circuit and the second medium circuit are separated from each other. When the fuel cell temperature is not lower than the linkage state temperature, the method sets the first medium circuit and the second medium circuit in a linkage state where the first medium circuit and the second medium circuit are interconnected and linked.

The vehicle control method according to this aspect of the invention sets the linkage state temperature to be lower than the warm-up termination temperature. Such temperature setting enables the first medium circuit and the second medium circuit to be interconnected and linked at an earlier timing on the occasion of requiring a specifically large amount of heat to be supplied to the air conditioning mechanism, for example, at the time of a start of the vehicle. Namely the waste heat of the fuel cell can effectively be utilized for heating up the heater core. This arrangement desirably restricts the use of a different heating element, such as an electric heater, for heating up the flow of the cooling medium supplied to the heater core and decreases a required amount of electric power to be generated by the fuel cell and to be supplied to the different heating element, such as the electric heater, thus improving the overall fuel consumption of the vehicle. The vehicle control method of the invention interconnects and links the first medium circuit and the second medium circuit, prior to termination of warm-up. This arrangement effectively prevents a relatively low-temperature flow of the cooling medium circulated in the second medium circuit from flowing into the first medium circuit after termination of the warm-up and damaging the effectiveness of the warm-up. The linkage of the first medium circuit and the second medium circuit at this timing also restricts the use of the different heating element, such as the electric heater, for heating up the relatively low-temperature flow of the cooling medium in the first medium circuit. The terminology 'warm-up termination temperature' in the description hereof means both a temperature at which the warm-up controller terminates the warm-up and a final temperature of the fuel cell attained by the warm-up (an eventually increased temperature of the fuel cell when there is a further temperature increase of the fuel cell by the circulated flow of the cooling medium even after termination of the warm-up).

BEST MODE FOR CARRYING OUT THE INVENTION

A. Embodiment

A1. System Configuration

Figure 1:
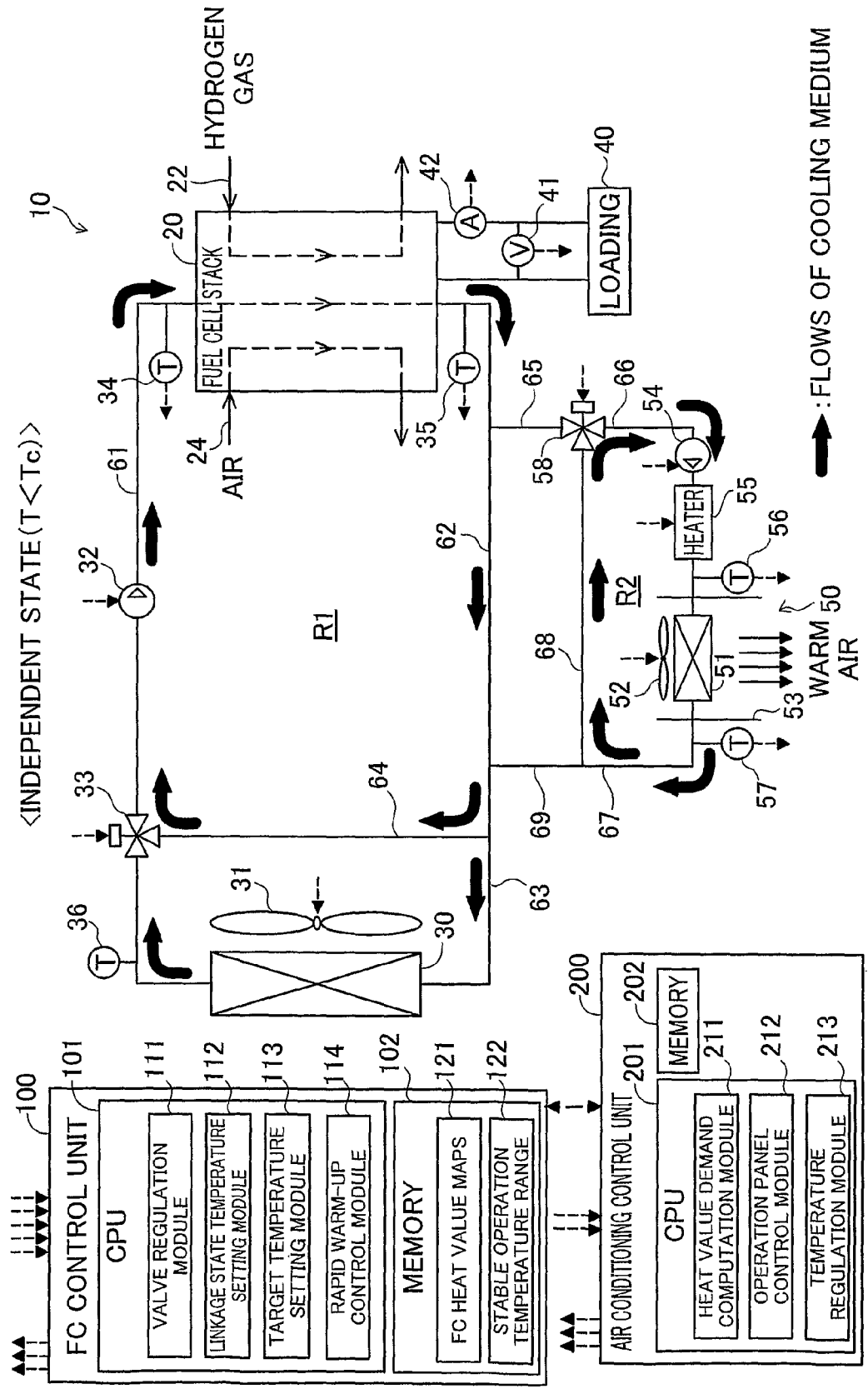
FIG. 1 is an explanatory view illustrating the schematic configuration of a vehicle control device according to one embodiment of the invention.

FIG. 1 is an explanatory view illustrating the schematic configuration of a vehicle control device according to one embodiment of the invention. This vehicle control device 10 is mounted on an electric vehicle that is driven with consumption of electric power generated by fuel cells as the driving power. The vehicle control device 10 includes a fuel cell stack 20 (in the specification hereof, 'fuel cell' may be abbreviated as FC), a first medium circuit R1, an air conditioning mechanism 50, a second medium circuit R2, two medium flow paths (fifth and ninth medium flow paths) 65 and 69 arranged to interconnect the two medium circuits R1 and R2, an FC control unit 100, and an air conditioning control unit 200.

The fuel cell stack 20 of this embodiment is a stack of polymer electrolyte fuel cells obtained by stacking multiple unit cells including membrane electrode assemblies (MEA). The fuel cell stack 20 receives a supply of hydrogen gas as a fuel gas from a hydrogen gas tank (not shown) through a fuel gas flow path 22. The fuel cell stack 20 also receives a supply of the air taken in by an air compressor (not shown) as an oxidation gas through an oxidation gas flow path 24. In addition to the flows of the fuel gas and the oxidation gas, the flow of a cooling medium is supplied to the fuel cell stack 20 to cool down the respective unit cells having a temperature increase in the course of power generation. In this embodiment, an antifreeze liquid is used for the cooling medium. Any other suitable medium, such as pure water, may be used for the cooling medium, instead of the antifreeze liquid.

The fuel cell stack 20 is electrically connected with loading 40, so that the electric power generated through the electrochemical reaction proceeding in the fuel cell stack 20 is supplied to the loading 40. A voltage sensor 41 and a current sensor 42 are installed between the fuel cell stack 20 and the loading 40. The loading 40 herein includes, for example, a drive motor (not shown) of the electric vehicle, as well as two electric fans 31 and 52, an electric heater 55, and two pumps 32 and 54 discussed later.

The first medium circuit R1 is constructed as a passage of the cooling medium to cool down the fuel cell stack 20 and includes first through fourth medium flow paths 61, 62, and 63. The first medium circuit R1 further includes the fourth medium flow path 64 to make a bypass flow of the cooling medium bypassing the radiator 30. The first medium circuit R1 is connected with the first pump 32, a radiator 30, the first electric fan 31, a first three-way valve 33, and first through third temperature sensors 34, 35, and 36.

The first medium flow path 61 is connected with the first three-way valve 33 and with a cooling medium flow inlet of the fuel cell stack 20. This arrangement of the first medium flow path 61 introduces the flow of the cooling medium out of the first three-way valve 33 into the fuel cell stack 20. The second medium flow path 62 is connected with a cooling medium flow outlet of the fuel cell stack 20 and with the third and the fourth medium flow paths 63 and 64. This arrangement of the second medium flow path 62 introduces the flow of the cooling medium out of the fuel cell stack 20 into the third medium flow path 63 or into the fourth medium flow path 64. The second medium flow path 62 is also connected with the fifth medium flow path 65 and with the ninth medium flow path 69. This arrangement of the second medium flow path 62 introduces the flow of the cooling medium out of the fuel cell stack 20 into the second medium circuit R2, while introducing the flow of the cooling medium out of the second medium circuit R2 into the third medium flow path 63 or into the fourth medium flow path 64. The third medium flow path 63 is connected with the second medium flow path 62 and with the first three-way valve 33. This arrangement of the third medium flow path 63 introduces the flow of the cooling medium out of the second medium flow path 62 into the first three-way valve 33. Like the third medium flow path 63, the fourth medium flow path 64 is connected with the second medium flow path 62 and with the first three-way valve 33. This arrangement of the fourth medium flow path 64 also introduces the flow of the cooling medium out of the second medium flow path 62 into the first three-way valve 33.

In the illustration of FIG. 1, thick solid arrows show the flows of the cooling medium. In the illustrated example of FIG. 1, the flow of the cooling medium in the medium circuit R1 is circulated in the sequence of the fuel cell stack 20, the second medium flow path 62, the third medium flow path 63 or the fourth medium flow path 64, and the first medium flow path 61. In the vehicle control device 10, the flow of the cooling medium out of the second medium flow path 62 may not be introduced at all into the third medium flow path 63 but may be fully introduced into the fourth medium flow path 64, as discussed later in detail.

In the illustrated example of FIG. 1, the cooling medium is circulated in the first medium circuit R1, independently of circulation of the cooling medium in the second medium circuit R2. In the description hereafter, this state of the vehicle control device 10 having the mutually independent and discrete circulations of the cooling medium in the first medium circuit R1 and in the second medium circuit R2 is referred to as 'independent state'. In the vehicle control device 10, the first medium circuit R1 and the second medium circuit R2 may be interconnected physically according to a temperature T of the fuel cell stack 20 to allow for the mutual inflows and outflows of the cooling medium. This state of the vehicle control device 10 establishing the interconnection between the first medium circuit R1 and the second medium circuit R2 to allow for the mutual inflows and outflows of the cooling medium is referred to as 'linkage state'.

The radiator 30 is installed in the third medium flow path 63. The first electric fan 31 is located in the vicinity of the radiator 30. The radiator 30 cools down the inflow of the cooling medium, which flows out of the fuel cell stack 20 and passes through the second medium flow path 62, with the air flow produced by the first electric fan 31 and releases the heat of the cooling medium out of the electric vehicle. As clearly understood from the layout with no radiator installed in the fourth medium flow path 64, the fourth medium flow path 64 works as a bypass circuit to bypass the radiator 30 and connect the second medium flow path 62 with the first medium flow path 61. The amount of heat radiation from the flow of the cooling medium going through the fourth medium flow path 64 is accordingly smaller than the amount of heat radiation from the flow of the cooling medium going through the third medium flow path 63.

The first three-way valve 33 is a solenoid valve connecting with the three medium flow paths 61, 63, and 64. Adjustment of the valve opening of the first three-way valve 33 regulates the ratio of the flow rate of the cooling medium flowing out of the third medium flow path 63 into the first medium flow path 61 to the flow rate of the cooling medium flowing out of the fourth medium flow path 64 into the first medium flow path 61. The first pump 32 is installed in the first medium flow path 61 to introduce the flow of the cooling medium out of the third medium flow path 63 and the fourth medium flow path 64 into the fuel cell stack 20.

The first temperature sensor 34 working as a warm-up termination temperature sensor is installed in the first medium flow path 61 at a specific position close to the cooling medium flow inlet of the fuel cell stack 20 and is used to measure the temperature of the cooling medium flowing through the first medium flow path 61. The second temperature sensor 35 is installed in the second medium flow path 62 at a specific position close to the cooling medium flow outlet of the fuel cell stack 20 and is used to measure the temperature of the cooling medium flowing through the second medium flow path 62. The third temperature sensor 36 is installed in the third medium flow path 63 at a specific position close to an outlet of the radiator 30 and is used to measure the temperature of the cooling medium flowing through the third medium flow path 63.

The air conditioning mechanism 50 includes a heater core 51, the second electric fan 52, and a casing 53. The heater core 51 is a heat exchange unit for heating and is warmed by the heat released from the cooling medium circulated through the second medium circuit R2. The second electric fan 52 blows the air into the heater core 51 and accordingly causes the warm air heated by the heater core 51 to be flowed out of the casing 53 (that is, into the vehicle interior). The air conditioning mechanism 50 is connected with respective air outlets (for example, a ventilator outlet, a foot outlet, and a defroster outlet) via air ducts (not shown) to make the flows of the warm air out of these air outlets.

The second medium circuit R2 is constructed as a passage of the cooling medium to transmit the heat to the air conditioning mechanism 50 (specifically to the heater core 51) and includes sixth through eighth medium flow paths 66, 67, and 68. The second medium circuit R2 is connected with a second three-way valve 58, the second pump 54, the electric heater 55, and fourth and fifth temperature sensors 56 and 57.

The sixth medium flow path 66 is connected with the second three-way valve 58 and with a cooling medium flow inlet of the heater core 51. This arrangement of the sixth medium flow path 66 introduces the flow of the cooling medium out of the second three-way valve 58 into the heater core 51. The seventh medium flow path 67 is connected with a cooling medium flow outlet of the heater core 51 and with the eighth and the ninth medium flow paths 68 and 69. This arrangement of the seventh medium flow path 67 introduces the flow of the cooling medium out of the heater core 51 into the eighth medium flow path 68 or into the ninth medium flow path 69. The fifth medium flow path 65 is connected with the second medium flow path 62 and with the second three-way valve 58. In the linkage state of the vehicle control device 10, this arrangement of the fifth medium flow path 65 introduces the flow of the cooling medium out of the second medium flow path 62 into the second three-way valve 58. The ninth medium flow path 69 is connected with the seventh medium flow path 67 and with the second medium flow path 62. In the linkage state of the vehicle control device 10, this arrangement of the ninth medium flow path 69 introduces the flow of the cooling medium out of the seventh medium flow path 67 into the second medium flow path 62.

As shown in FIG. 1, in the independent state of the vehicle control device 10, the flow of the cooling medium is circulated in the second medium circuit R2 in the sequence of the heater core 51, the seventh medium flow path 67, the eighth medium flow path 68, and the sixth medium flow path 66.

The second three-way valve 58 is a solenoid valve connected with the three medium flow paths 65, 66, and 68. Adjustment of the valve opening of the second three-way valve 58 switches over the connection state between the connection of the sixth medium flow path 66 with the fifth medium flow path 65 and the connection of the sixth medium flow path 66 with the eighth medium flow path 68.

The second pump 54 is installed in the sixth medium flow path 66 and is used to introduce the flow of the cooling medium out of either the fifth medium flow path 65 or the eighth medium flow path 68 into the heater core 51. The electric heater 55 is located between the second pump 54 and the heater core 51 to warm up the cooling medium flowing through the sixth medium flow path 66.

The fourth temperature sensor 56 is installed in the sixth medium flow path 66 at a specific position close to the cooling medium flow inlet of the heater core 51 and is used to measure the temperature of the cooling medium flowing into the heater core 51. The fifth temperature sensor 57 is installed in the seventh medium flow path 67 at a specific position close to the cooling medium flow outlet of the heater core 51 and is used to measure the temperature of the cooling medium flowing out of the heater core 51.

The FC control unit 100 includes a CPU (central processing unit) 101 and a memory 102. The memory 102 stores therein an FC control program (not shown) performed to control the operations of the fuel cell stack 20. The CPU 101 executes the FC control program to attain the functions of a valve regulation module 111, a linkage state temperature setting module 112, a target temperature setting module 113, and a rapid warm-up control module 114. The FC control unit 100 is connected with the first pump 32, the first three-way valve 33, and the second three-way valve 58 to control the operations of these elements. The FC control unit 100 is also connected with the three temperature sensors 34 through 36, the voltage sensor 41, and the current sensor 42 to obtain the measurement values from these sensors. The FC control unit 100 is interconnected with the air conditioning control unit 200 to exchange information with the air conditioning control unit 200.

The valve regulation module 111 works to regulate the valve openings of the first three-way valve 33 and the second three-way valve 58. The linkage state temperature setting module 112 works to set a temperature giving permission for linkage of the first medium circuit R1 with the second medium circuit R2 (hereafter referred to as 'linkage state temperature'). The target temperature setting module 113 works to set a desired temperature set as a target (hereafter referred to as 'target temperature') in regulation of the temperature of the cooling medium supplied to the fuel cell stack 20.

The rapid warm-up control module 114 rapidly warms up the fuel cell stack 20 until the temperature of the fuel cell stack 20 enters a specific temperature range having a sufficiently high power generation efficiency in the respective unit cells (hereafter referred to as 'high efficiency temperature range') (this process is called 'rapid warm-up'). This high efficiency temperature range may be, for example, a range of not lower than 72° C. and not higher than 80° C. A typical method of the rapid warm-up restricts the flow rate of the air supplied to the fuel cell stack 20 to be lower than the air flow rate in the ordinary driving state. The air flow rate may be restricted, for example, by setting the air excess ratio or the ratio of the air flow rate to the stoichiometric value to about 1.0. The restricted air flow rate causes the fuel cell stack 20 to be operated with a low power generation efficiency and increases the power generation loss (heat loss), thereby rapidly warming up the fuel cell stack 20.

In addition to the FC control program explained above, FC heat value maps 121 and a stable operation temperature range 122 have been stored in advance in the memory 102.

Figure 2:
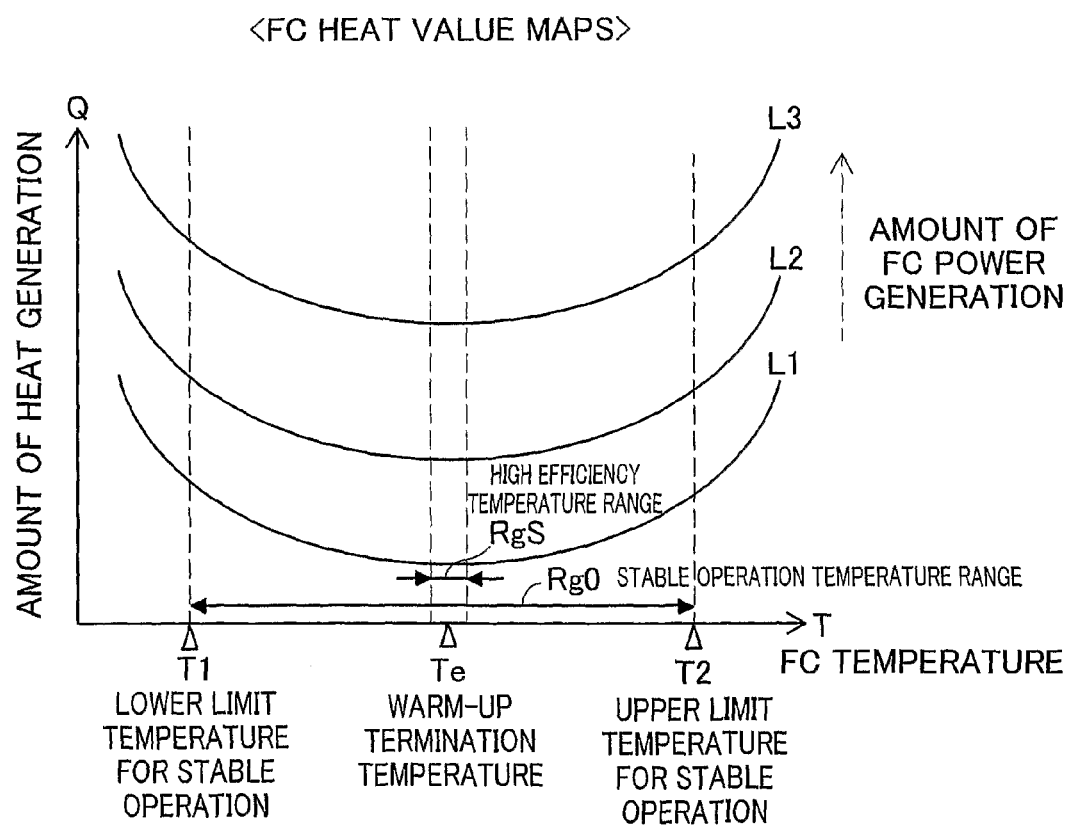
FIG. 2 is an explanatory view schematically showing the FC heat value maps of FIG. 1.

FIG. 2 is an explanatory view schematically showing the FC heat value maps of FIG. 1. Each of the FC heat value maps shown in FIG. 2 has the temperature (T) of the fuel cell stack 20 as the abscissa and the amount of heat generation or the heat value as the ordinate. Each of the FC heat value maps 121 shows a variation in amount of heat generation by the fuel cell stack 20 (FC heat value) against the temperature of the fuel cell stack 20. Multiple maps with regard to different amounts of FC power generation are stored as the FC heat value maps 121 into the memory 102. FIG. 2 schematically shows three maps L1 through L3 having different variations of the FC heat value. The number of the FC heat value maps 121 is, however, not restricted to three, but any number of maps with regard to different amounts of FC power generation may be stored as the FC heat value maps 121 into the memory 102. The FC heat value maps 121 (L1 through L3) may be set experimentally by measuring the amount of power generation and the amount of heat generation at various temperature values of the fuel cell stack 20 and may be stored in advance in the memory 102.

The higher amount of power generation by the fuel cell stack 20 leads to the higher amount of heat generation by the fuel cell stack 20 at a fixed temperature. In the illustrated example of FIG. 2, the amount of power generation by the fuel cell stack 20 increases in the order of the map L1, the map L2, and the map L3. The amount of heat generation at a fixed temperature accordingly increases in the order of the map L1, the map L2, and the map L3.

As shown in each of the maps L1 through L3, in a low temperature range (T<T1), the amount of heat generation has a significant variation with a temperature change. More specifically, in the low temperature range, even a slight temperature decrease results in an abrupt increase of the amount of heat generation. This phenomenon is due to the following reason. In the low temperature range, the temperature decrease of the fuel cell stack 20 inhibits the catalytic activity in each MEA and causes the flooding. The occurrence of flooding decreases an effective catalytic amount or effective catalytic activity (equivalent to an effective power generation area) to lower the power generation efficiency, thereby generating heat. In a high temperature range (T>T2), on the other hand, even a slight temperature increase results in an abrupt increase of the amount of heat generation. This phenomenon is due to the following reason. In the high temperature range, the temperature increase of the fuel cell stack 20 dries an electrolyte membrane in each MEA to heighten the value of membrane resistance, thereby generating heat.

In the low temperature range and in the high temperature range explained above, some voltage drop is observed in several unit cells among the multiple unit cells constituting the fuel cell stack 20. In this state, the overall output voltage of the fuel cell stack 20 is rather unstable. These temperature ranges (T<T1 and T>T2) are thus unsuitable for the operation temperature of the fuel cell stack 20. The output voltage of the fuel cell stack 20 is stabilized, on the other hand, in a temperature range Rg0 satisfying a relation of $T1 \leq T \leq T2$ (hereafter referred to as 'stable operation temperature range Rg0'). This stable operation temperature range Rg0 is thus suitable for the operation temperature of the fuel cell stack 20. A lower limit temperature T1 and an upper limit temperature T2 of the stable operation temperature range Rg0 are experimentally determined in advance and are stored as the stable operation temperature range 122 of FIG. 1 into the memory 102. For example, the lower limit temperature T1 and the upper limit temperature T2 may respectively be set to 30° C. and 90° C.

As shown in FIG. 2, there is a high efficiency temperature range RgS on the center of the stable operation temperature range Rg0. In this high efficiency temperature range RgS, the respective unit cells have the highest power generation efficiency and thereby the minimum amount of heat generation (the minimum heat loss). A warm-up termination temperature Te is set in the high efficiency temperature range RgS. The rapid warm-up of the fuel cell stack 20 starts when the temperature T of the fuel cell stack 20 is in a preset relatively low temperature range for example, in a temperature range of not higher than 0° C.). The rapid warm-up of the fuel cell stack 20 terminates when the temperature T of the fuel cell stack 20 reaches the warm-up termination temperature Te.

The air conditioning control unit 200 shown in FIG. 1 includes a CPU 201 and a memory 202. The memory 202 stores therein an air conditioning control program (not shown) performed to control the operations of the air conditioning mechanism 50. The CPU 201 executes this air conditioning control program to attain the functions of a heat value demand computation module 211, an operation panel control module 212, and a temperature regulation module 213. The heat value demand computation module 211 calculates a heat value demand, which is to be sent to the FC control unit 100, according to a heating demand enabled process discussed later. The operation panel control module 212 is connected with an operation panel (not shown) installed in the electric vehicle and receives the user's inputs through the user's manipulation of the operation panel. The user's inputs include, for example, the user's heating or cooling request and the user's setting of a desired vehicle interior temperature. The temperature regulation module 213 controls the operations of the electric heater 55 and the second electric fan 52 to adjust the temperature of the air blown out of the air conditioning mechanism 50 and thereby regulate the vehicle interior temperature to the user's desired temperature.

The air conditioning control unit 200 is connected with the second pump 54, the electric heater 55, and the second electric fan 52 to control the operations of these elements. The air conditioning control unit 200 is also connected with the two temperature sensors 56 and 57 to obtain the measurement values from these sensors.

The memory 202 stores therein a control map (not shown) to control the operations of the air conditioning mechanism 50. The temperature regulation module 213 refers to this control map and controls the operations of the electric heater 55 and the second electric fan 52 based on the observed temperatures obtained from the two temperature sensors 56 and 57.

The vehicle control device 10 having the configuration discussed above performs the heating demand enabled process, a temperature setting process, and a temperature regulation process discussed below, so as to improve the overall fuel consumption of the system.

The first three-way valve 33 of the embodiment corresponds to the regulating valve in the claims of the invention. The combination of the second three-way valve 58 and the valve regulation module 111 in the embodiment is equivalent to the status switchover module in the claims of the invention. The combination of the linkage state temperature setting module 112 and the target temperature setting module 113 in the embodiment is equivalent to the target temperature setting module, the heat value demand acquisition module, the power generation amount acquisition module, and the below-demand temperature range identification module in the claims of the invention. The fourth medium flow path 64 of the embodiment corresponds to the bypass circuit in the claims of the invention. The first pump 32 and the second pump 54 of the embodiment respectively correspond to the cooling medium circulation pump in the claims of the invention. The warm-up termination temperature Te of the embodiment is equivalent to the warm-up termination temperature in the claims of the invention.

A2. Heating Demand Enabled Process and Temperature Setting Process

Figure 3:
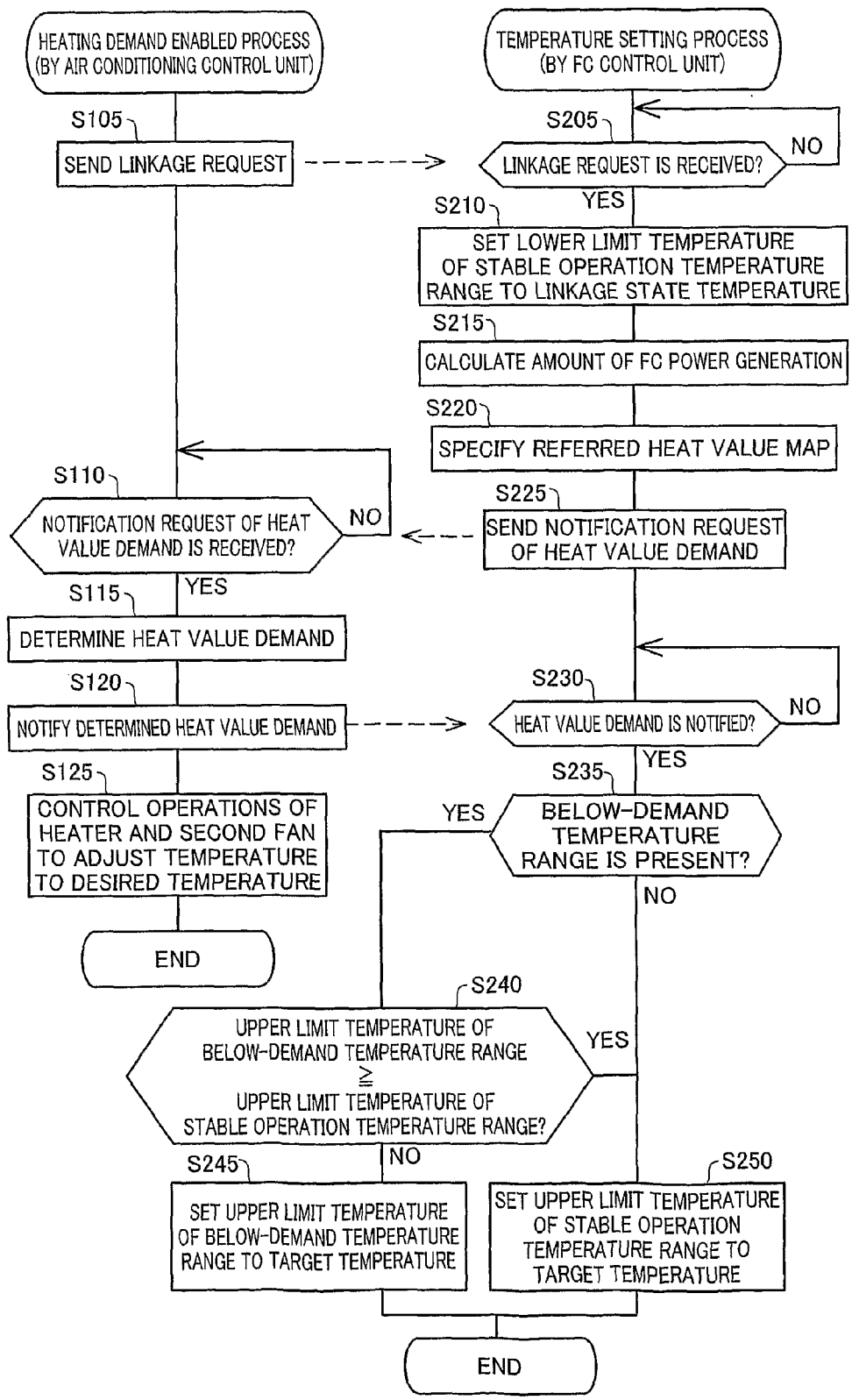
FIG. 3 is flowcharts showing the details of the heating demand enabled process and the temperature setting process.

FIG. 3 is flowcharts showing the details of the heating demand enabled process and the temperature setting process. The left flowchart in FIG. 3 shows the processing flow of the heating demand enabled process, and the right flowchart shows the processing flow of the temperature setting process. In response to input of the user's heating request and the user's setting of a desired vehicle interior temperature through the user's manipulation of the operation panel (not shown), the air conditioning control unit 200 starts the heating demand enabled process. The heating demand enabled process is performed by the air conditioning control unit 200 to control the operations of the air conditioning mechanism 50 in response to the user's heating request. The FC control unit 100 starts the temperature setting process after a start of the electric vehicle (not shown). The temperature setting process is performed to set a linkage state temperature and a target temperature used in the temperature regulation process discussed later. The following explanation is on the assumption that the user's heating request is given immediately after a start of the electric vehicle. The rapid warm-up control module 114 performs the rapid warm-up of the fuel cell stack 20, in parallel with the heating demand enabled process and the temperature setting process.

On the start of the heating demand enabled process, the operation panel control module 212 sends a linkage request to the FC control unit 100 (step S105). The linkage request represents a requirement for setting the vehicle control device 10 in the linkage state.

In the temperature setting process, the FC control unit 100 or specifically the linkage state temperature setting module 112 waits for reception of the linkage request (step S205). In response to reception of the linkage request, the linkage state temperature setting module 112 reads the stable operation temperature range 122 from the memory 102 and sets the lower limit temperature of the stable operation temperature range 122 to a linkage state temperature (step S210). In the illustrated example of FIG. 2, the lower limit temperature T1 of the stable operation temperature range Rg0 is set to a linkage state temperature Tc. The linkage state temperature Tc herein represents a temperature giving permission for linkage of the two medium circuits R1 and R2.

In the vehicle control device 10, the two medium circuits R1 and R2 are not linked under the condition of the temperature T of the fuel cell stack 20 that is lower than the linkage state temperature Tc, while being linked under the condition of the temperature T of the fuel cell stack 20 that is not lower than the linkage state temperature Tc.

The lower limit temperature T1 of the stable operation temperature range Rg0 is set to the linkage state temperature Tc, because of the following reason. The lower limit temperature T1 is lower than the warm-up termination temperature Te (or the final value of the temperature T of the fuel cell stack 20 attained by the rapid warm-up), so that the two medium circuits R1 and R2 are linkable before the temperature T of the fuel cell stack 20 reaches the high efficiency temperature range RgS. The waste heat of the fuel cell stack 20 can thus be effectively utilized for heating the heater core 51. This arrangement desirably restricts the use of the electric heater 55 and thereby improves the overall fuel consumption of the vehicle control device 10. The linkage of the two medium circuits R1 and R2 prior to termination of the rapid warm-up effectively prevents the relatively low-temperature flow of the cooling medium circulated in the second medium circuit R2 from flowing into the first medium circuit R1 after termination of the rapid warm-up and damaging the effectiveness of the warm-up. On a start of the linkage state, the temperature of the cooling medium circulated in the second medium circuit R2 is relatively lower than the temperature of the cooling medium circulated in the first medium circuit R1. The linkage of the two medium circuits R1 and R2 temporarily lowers the temperature T of the fuel cell stack 20. Setting a lower temperature than the lower limit temperature T1 of the stable operation temperature range Rg0 to the linkage state temperature Tc may cause the temperature T of the fuel cell stack 20 to be lowered below the stable operation temperature range Rg0 after the linkage and thereby cause the poor output stability. The vehicle control device 10 of the embodiment sets the lower limit temperature T1 of the stable operation temperature range Rg0 to the linkage state temperature Tc, so as to assure the sufficient output stability of the fuel cell stack 20.

The target temperature setting module 113 calculates the amount of power generation by the fuel cell stack 20 from the value of electric current sent from the current sensor 42 and the value of voltage sent from the voltage sensor 41 (step S215). The target temperature setting module 113 specifies an FC heat value map to be currently referred to (hereafter referred to as 'referred heat value map') among the multiple FC heat value maps 121 stored in the memory 102, based on the amount of power generation calculated at step S215 (step S220). As explained previously, the multiple FC heat value maps 121 are set with regard to the different amounts of power generation by the fuel cell stack 20. The referred heat value map is accordingly specified corresponding to the current amount of power generation calculated at step S215. When none of the stored FC heat value maps corresponds to the calculated amount of power generation, an FC heat value map corresponding to the amount of power generation closest to the calculated amount of power generation may be specified as the referred heat value map. Alternatively two FC heat value maps corresponding to a lower amount of power generation and a higher amount of power generation around the calculated amount of power generation may be specified as the referred heat value map.

After specifying the referred heat value map, the target temperature setting module 113 sends a notification request of a heat value demand to the air conditioning control unit 200 (step S225). The terminology 'heat value demand' herein represents a required amount of heat generation for heating up the heater core 51, in order to adjust the vehicle interior temperature to the user's desired temperature.

The air conditioning control unit 200 or specifically the heat value demand computation module 211 waits for reception of the notification request of the heat value demand (step S110) after the transmission of the linkage request at step S105. In response to reception of the notification request of the heat value demand, the heat value demand computation module 211 determines the heat value demand (step S115). The heat value demand may be determined by a known procedure, based on the user's setting of the desired vehicle interior temperature, the ambient temperature, the air ventilation rate (the utilization ratio of the vehicle internal air to the vehicle external air), the amount of solar radiation, and the amount of heat released from the vehicle windows.

After determination of the heat value demand, the heat value demand computation module 211 notifies the FC control unit 100 of the determined heat value demand (step S120). After the notification of the heat value demand, the temperature regulation module 213 refers to a control map (not shown) to control the operations of the electric heater 55 and the second electric fan 52, so as to regulate the temperature of the cooling medium flowed into the heater core 51 and make the warm air blown out of the air conditioning mechanism 50 (step S125).

After the transmission of the notification request at step S225, the FC control unit 100 or specifically the target temperature setting module 113 waits for notification of the determined heat value demand (step S230). In response to notification of the heat value demand, the target temperature setting module 113 determines whether a specific temperature range having the amount of heat generation or the heat value lower than the notified heat value demand (hereafter referred to as 'below-demand temperature range') is present in the referred heat value map (step S235).

Figure 4:
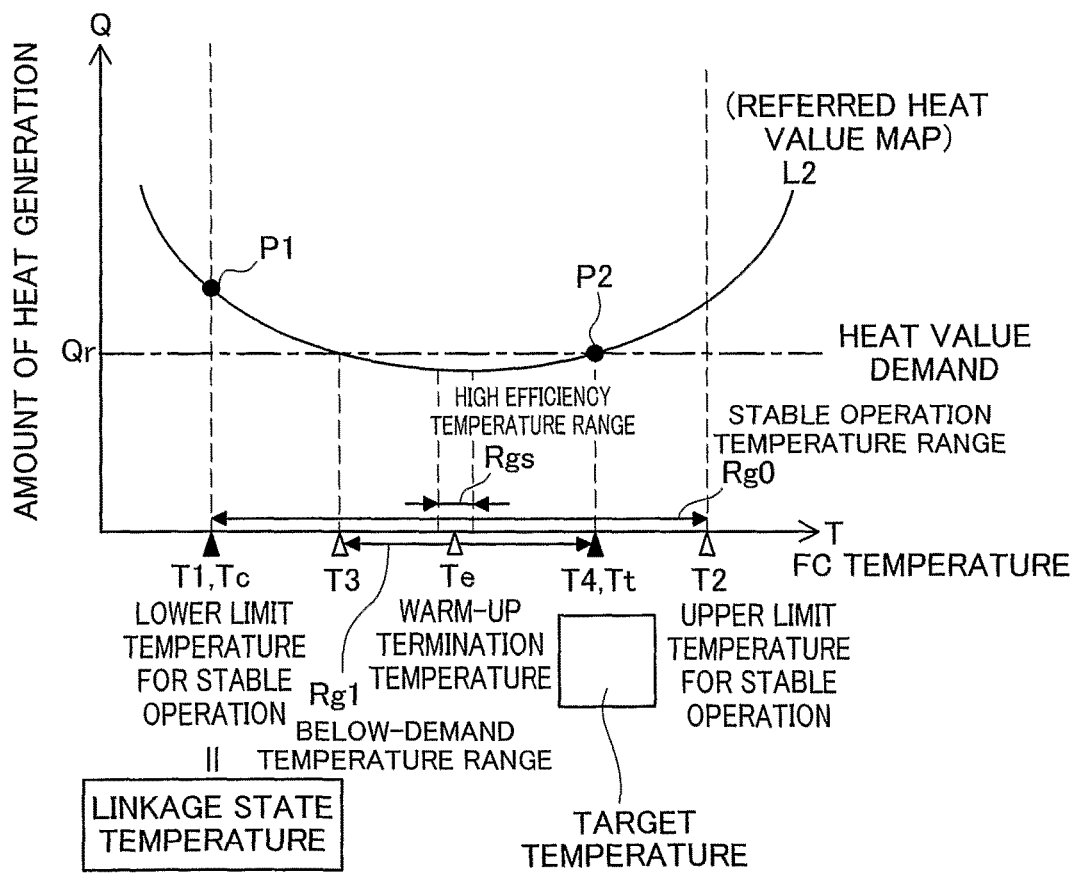
FIG. 4 is an explanatory view showing a first example of the relation between the referred heat value map and the heat value demand.

FIG. 4 is an explanatory view showing a first example of the relation between the referred heat value map and the heat value demand. The abscissa and the ordinate of FIG. 4 are identical with those of FIG. 2. In the illustrated example of FIG. 4, the FC heat value map L2 shown in FIG. 2 is specified as the referred heat value map, and a heat value Qr is determined as the heat value demand.

As shown in FIG. 4, a below-demand temperature range Rg1 having the amount of heat generation or the heat value lower than the determined heat value Qr is present in the FC heat value map L2 specified as the referred heat value map. In the below-demand temperature range Rg1, the fuel cell stack 20 has a relatively low amount of heat generation or a low heat value. Even in the state of linkage of the two medium circuits R1 and R2 to supply the flow of cooling medium out of the fuel cell stack 20 to the heater core 51, only the heat of the cooling medium is insufficient to increase the temperature of the heater core 51 to a desired temperature level.

Referring back to the flowchart of FIG. 3, upon determination of the presence of the below-demand temperature range, the target temperature setting module 113 subsequently determines whether an upper limit temperature of the below-demand temperature range is not lower than the upper limit temperature of the stable operation temperature range (step S240). When the upper limit temperature of the below-demand temperature range is not lower than the upper limit temperature of the stable operation temperature range, the target temperature setting module 113 sets the upper limit temperature of the stable operation temperature range to a target temperature Tt (step S250). When the upper limit temperature of the below-demand temperature range is lower than the upper limit temperature of the stable operation temperature range, on the other hand, the target temperature setting module 113 sets the upper limit temperature of the below-demand temperature range to the target temperature Tt (step S245).

In the illustrated example of FIG. 4, an upper limit temperature T4 of the below-demand temperature range Rg1 is lower than the upper limit temperature T2 of the stable operation temperature range Rg0. In this case, the upper limit temperature T4 of the below-demand temperature range Rg1 is accordingly set to the target temperature Tt.

Setting the upper limit temperature T4 of the below-demand temperature range Rg1 to the target temperature Tt aims to assure generation of a minimum amount of heat for satisfying the heat value demand Qr by the fuel cell stack 20. Setting the upper limit temperature T4 of the below-demand temperature range Rg1 to the target temperature Tt causes the target temperature Tt to be not higher than the upper limit temperature T2 of the stable operation temperature range Rg0. Such setting aims to assure the stability of the output voltage from the fuel cell stack 20. Not a lower limit temperature T3 of the below-demand temperature range Rg1 but the upper limit temperature T4 of the below-demand temperature range Rg1 is set to the target temperature Tt, because of the following reason. In the state where the lower limit temperature T3 of the below-demand temperature range Rg1 is set to the target temperature Tt, when the temperature of the cooling medium increases to exceed the lower limit temperature T3 with a temperature rise of the fuel cell stack 20, the waste heat of the fuel cell stack 20 is wastefully released via the cooling medium from the radiator 30 as explained later. In the state where the upper limit temperature T4 of the below-demand temperature range Rg1 is set to the target temperature Tt, on the other hand, even when the temperature of the cooling medium increases to exceed the lower limit temperature T3, the heat of the cooling medium is not discharged but is used for heating.

Figure 5:
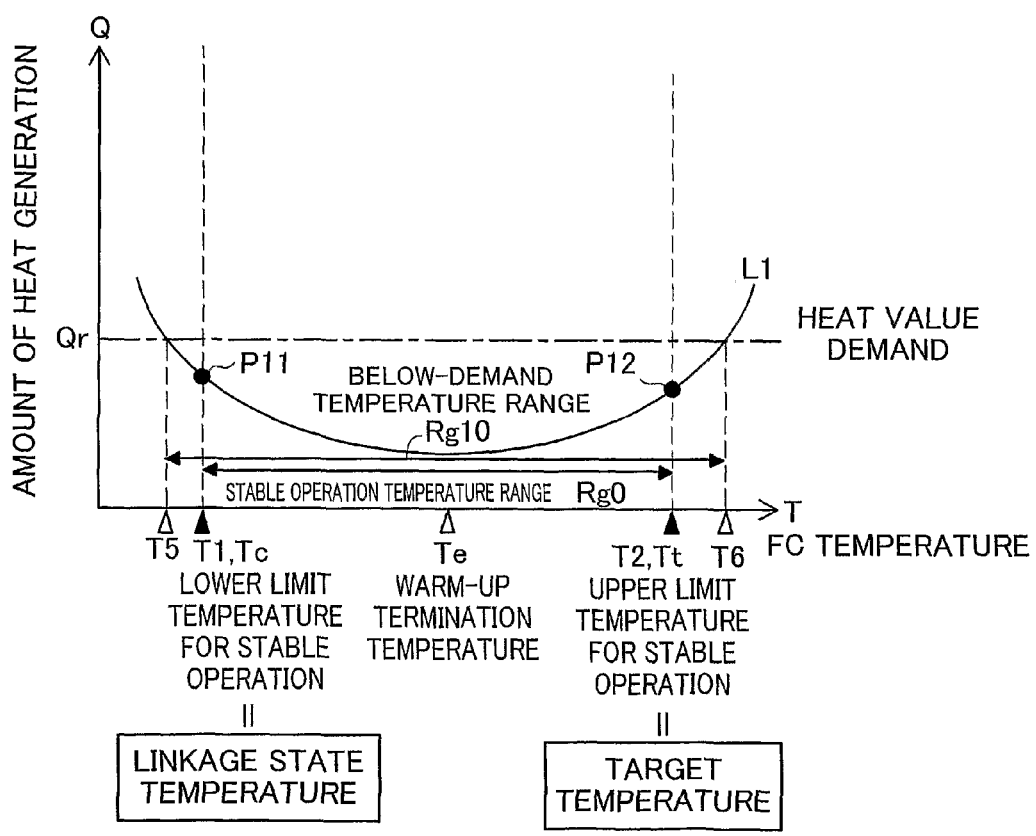
FIG. 5 is an explanatory view showing a second example of the relation between the referred heat value map and the heat value demand.

FIG. 5 is an explanatory view showing a second example of the relation between the referred heat value map and the heat value demand. The abscissa and the ordinate of FIG. 5 are identical with those of FIG. 4. In the illustrated example of FIG. 5, the FC heat value map L1 shown in FIG. 2 is specified as the referred heat value map, and the heat value Qr is determined as the heat value demand.

As shown in FIG. 5, a below-demand temperature range Rg10 is present in the FC heat value map L1 specified as the referred heat value map. An upper limit temperature T6 of the below-demand temperature range Rg10 is, however, higher than the upper limit temperature T2 of the stable operation temperature range Rg0. In this case, the temperature setting process performs the processing of step S250 to set the upper limit temperature T2 of the stable operation temperature range Rg0 to the target temperature Tt.

Setting the upper limit temperature T2 of the stable operation temperature range Rg0 to the target temperature Tt causes a highest possible temperature to be set to the target temperature Tt within the stable operation temperature range Rg0. Such setting aims to assure the stability of the output voltage from the fuel cell stack 20. Such setting also aims to enable an amount of heat closest possible to the determined heat value demand Qr to be supplied to the heater core 51 and thereby improve the fuel consumption of the fuel cell stack 20.

Figure 6:
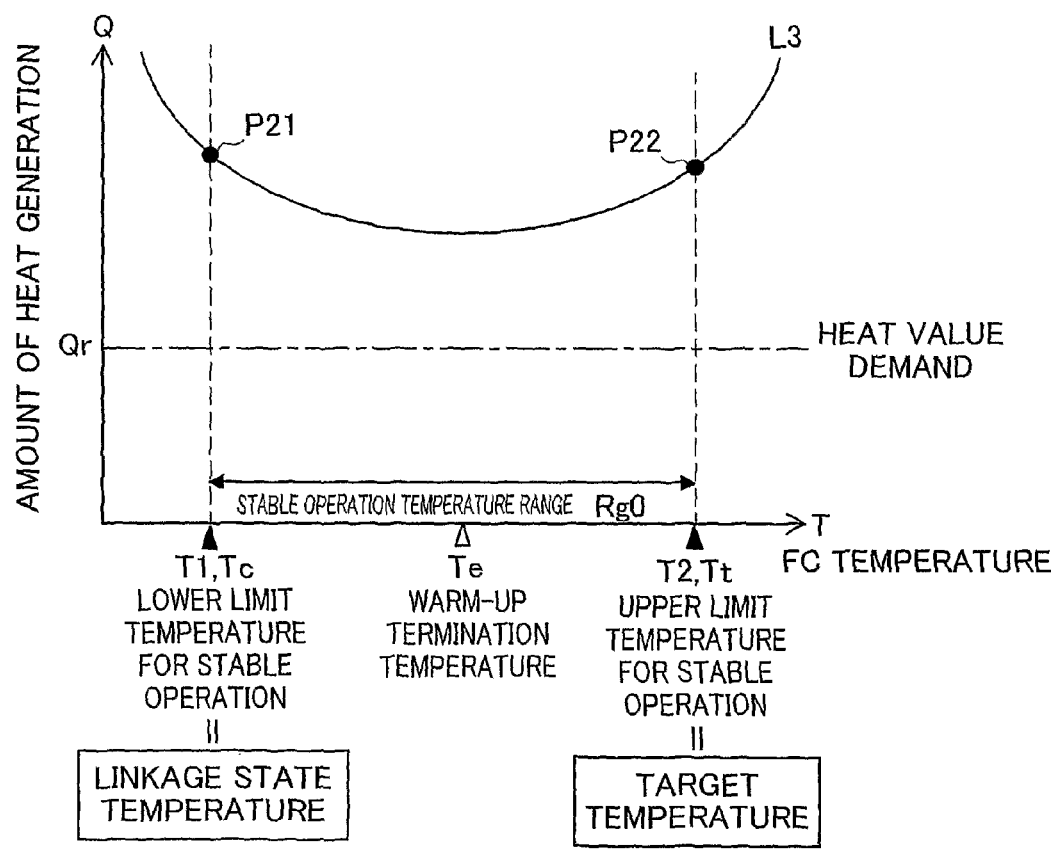
FIG. 6 is an explanatory view showing a third example of the relation between the referred heat value map and the heat value demand.

FIG. 6 is an explanatory view showing a third example of the relation between the referred heat value map and the heat value demand. The abscissa and the ordinate of FIG. 6 are identical with those of FIG. 4. In the illustrated example of FIG. 6, the FC heat value map L3 shown in FIG. 2 is specified as the referred heat value map, and the heat value Qr is determined as the heat value demand.

As shown in FIG. 6, no below-demand temperature range is present in the FC heat value map L3 specified as the referred heat value map. As in the case of FIG. 5, in this case, the temperature setting process performs the processing of step S250 to set the upper limit temperature T2 of the stable operation temperature range Rg0 to the target temperature Tt.

Setting the upper limit temperature T2 of the stable operation temperature range Rg0 to the target temperature Tt causes a highest possible temperature to be set to the target temperature Tt within the stable operation temperature range Rg0. Such setting aims to assure the stability of the output voltage from the fuel cell stack 20. Such setting also aims to minimize the release of the waste heat of the fuel cell stack 20 from the radiator 30.

A3. Temperature Regulation Process

Figure 7:
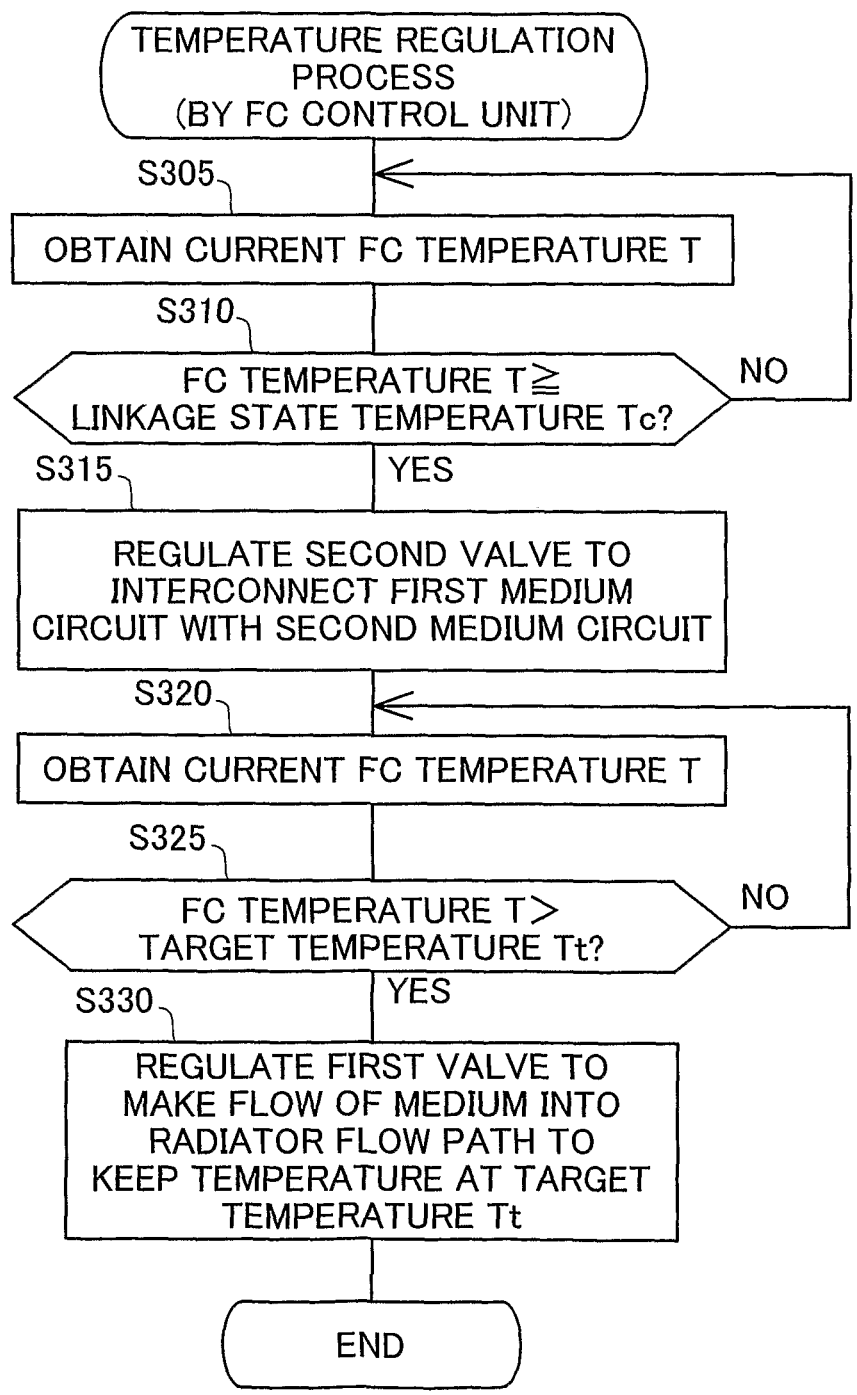
FIG. 7 is a flowchart showing the details of the temperature regulation process performed by the FC control unit.

FIG. 7 is a flowchart showing the details of the temperature regulation process performed by the FC control unit. On completion of the temperature setting process discussed below, the FC control unit 100 starts the processing flow of the temperature regulation process. The following explanation is on the assumption that the vehicle control device 10 is set in the independent state as shown in FIG. 1, prior to a start of the temperature regulation process. In the independent state of FIG. 1, it is assumed more specifically that there is no flow of the cooling medium toward the radiator 30 and that the flow of the cooling medium going through the second medium flow path 62 is fully flowed into the fourth medium flow path 64.

The valve regulation module 111 first obtains the current temperature T of the fuel cell stack 20 (step S305). In this embodiment, the temperature measured by the second temperature sensor 35 is used as the temperature T of the fuel cell stack 20 (that is, as the representative temperature T representing the temperature of the fuel cell stack 20). This temperature setting is, however, neither essential nor restrictive. In place of the temperature measured by the second temperature sensor 35, the temperature measured by any of the other illustrated temperature sensors or the temperature measured by any of temperature sensors (not shown) installed in the oxidation gas flow path 24 and in the fuel gas flow path 22 may be used as the temperature T of the fuel cell stack 20.

The valve regulation module 111 then waits for an increase in temperature T of the fuel cell stack 20 to or above a linkage state temperature (step S310). The temperature T of the fuel cell stack 20 starts increasing on a start of power generation by the fuel cell stack 20.

When the temperature T of the fuel cell stack 20 rises to reach a linkage state temperature Tc, the valve regulation module 111 regulates the second three-way valve 58 to make the flow of the cooling medium from the fifth medium flow path 65 to the sixth medium flow path 66, so as to interconnect (link) the first medium circuit R1 with the second medium circuit R2 (step S315).

Figure 8:
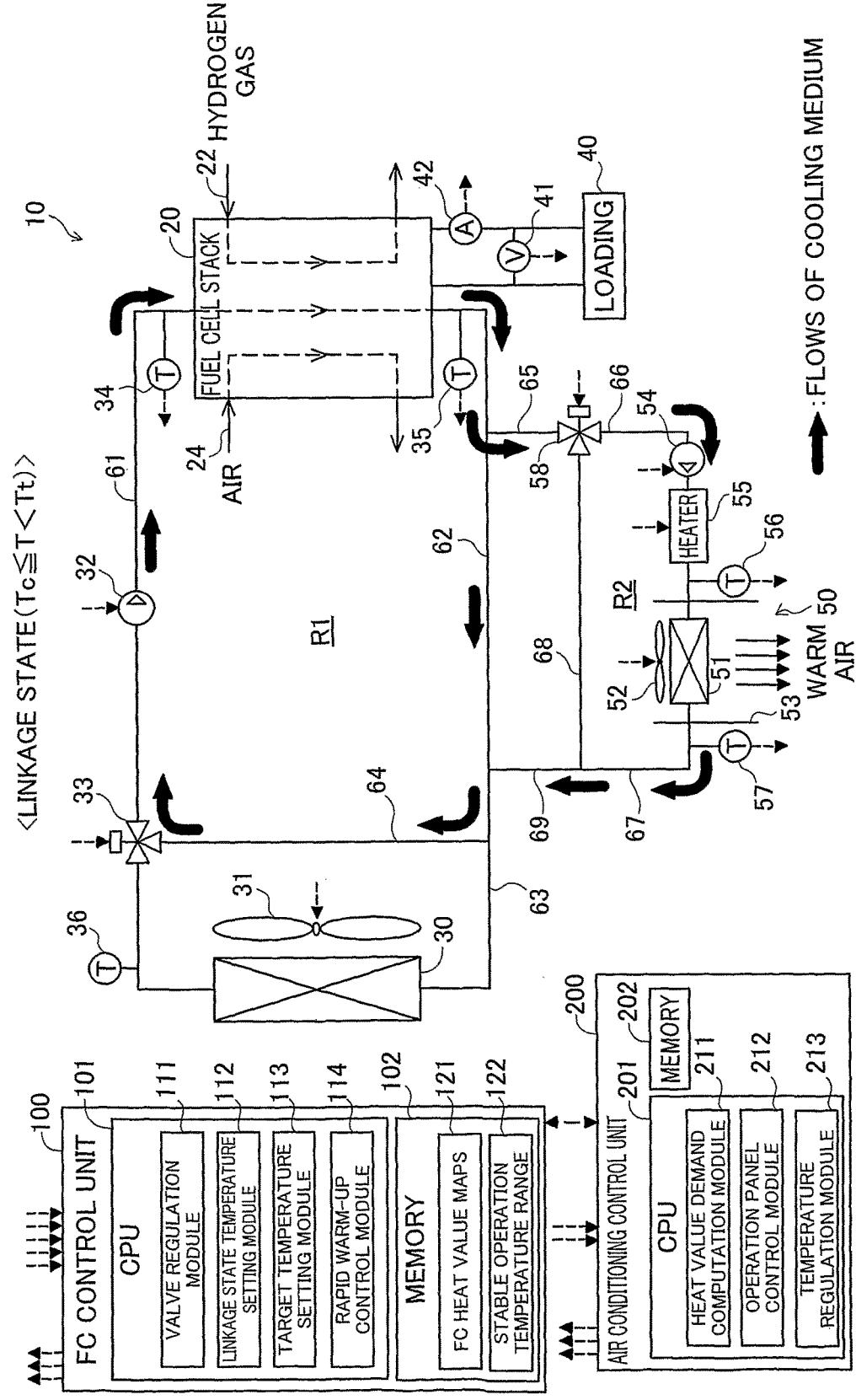
FIG. 8 is a first explanatory view showing the flows of the cooling medium in the vehicle control device set in the linkage state.

FIG. 8 is a first explanatory view showing the flows of the cooling medium in the vehicle control device set in the linkage state. The flows of the cooling medium shown in FIG. 8 are under the condition that the temperature T of the fuel cell stack 20 is in a specific temperature range of not lower than the linkage state temperature Tc but lower than the target temperature Tt.

As shown in FIG. 8, in the linkage state, the flow of the cooling medium out of the fuel cell stack 20 goes through the fifth medium flow path 65 and the second three-way valve 58 and flows into the sixth medium flow path 66. The flow of the cooling medium is then flowed through the electric heater 55 into the heater core 51 by means of the second pump 54. Part of the flow of the cooling medium out of the fuel cell stack 20 goes into the second medium flow path 62, instead of the fifth medium flow path 65. The flow of the cooling medium out of the heater core 51 goes through the seventh medium flow path 67 and the ninth medium flow path 69 and flows back to the second medium flow path 62. The flow of the cooling medium then goes through the fourth medium flow path 64 and is flowed back to the first medium flow path 61. In this state, there is no flow of the cooling medium going through the second medium flow path 62 and flowing into the third medium flow path 63. The cooling medium is accordingly not cooled down by the radiator 30. The temperature of the cooling medium flowed into the heater core 51 is gradually increased with the waste heat generated in the course of power generation by the fuel cell stack 20.

Referring back to the flowchart of FIG. 7, after the interconnection at step S315, the valve regulation module 111 obtains the current temperature T of the fuel cell stack 20 (step S320) and determines whether the obtained temperature T of the fuel cell stack 20 is higher than the target temperature Tt (step S325). The valve regulation module 111 repeats the processing of steps S320 and S325 until the temperature T of the fuel cell stack 20 reaches or exceeds the target temperature Tt.

When the temperature T of the fuel cell stack 20 reaches or exceeds the target temperature Tt, the valve regulation module 111 regulates the first three-way valve 33 to increase the flow rate of the cooling medium flowing from the second medium flow path 62 to the third medium flow path 63 (step S330). The flow of the cooling medium into the third medium flow path 63 is cooled down by the radiator 30, in order to enable the temperature T of the fuel cell stack 20 to be kept at the target temperature Tt. According to a concrete procedure, the valve regulation module 111 takes into account the amount of heat generation by the fuel cell stack 20 and sets a target value for the temperature measured by the temperature sensor 34 (that is, the inlet temperature of the fuel cell stack 20), so as to make the temperature measured by the second temperature sensor 35 (that is, the outlet temperature of the fuel cell stack 20) equal to the target temperature. The valve regulation module 111 then regulates the opening of the first three-way valve 33 based on the temperature measured by the third temperature sensor 36 (that is, the outlet temperature of the radiator 30), so as to make the inlet temperature of the fuel cell stack 20 equal to the set target value.

Figure 9:
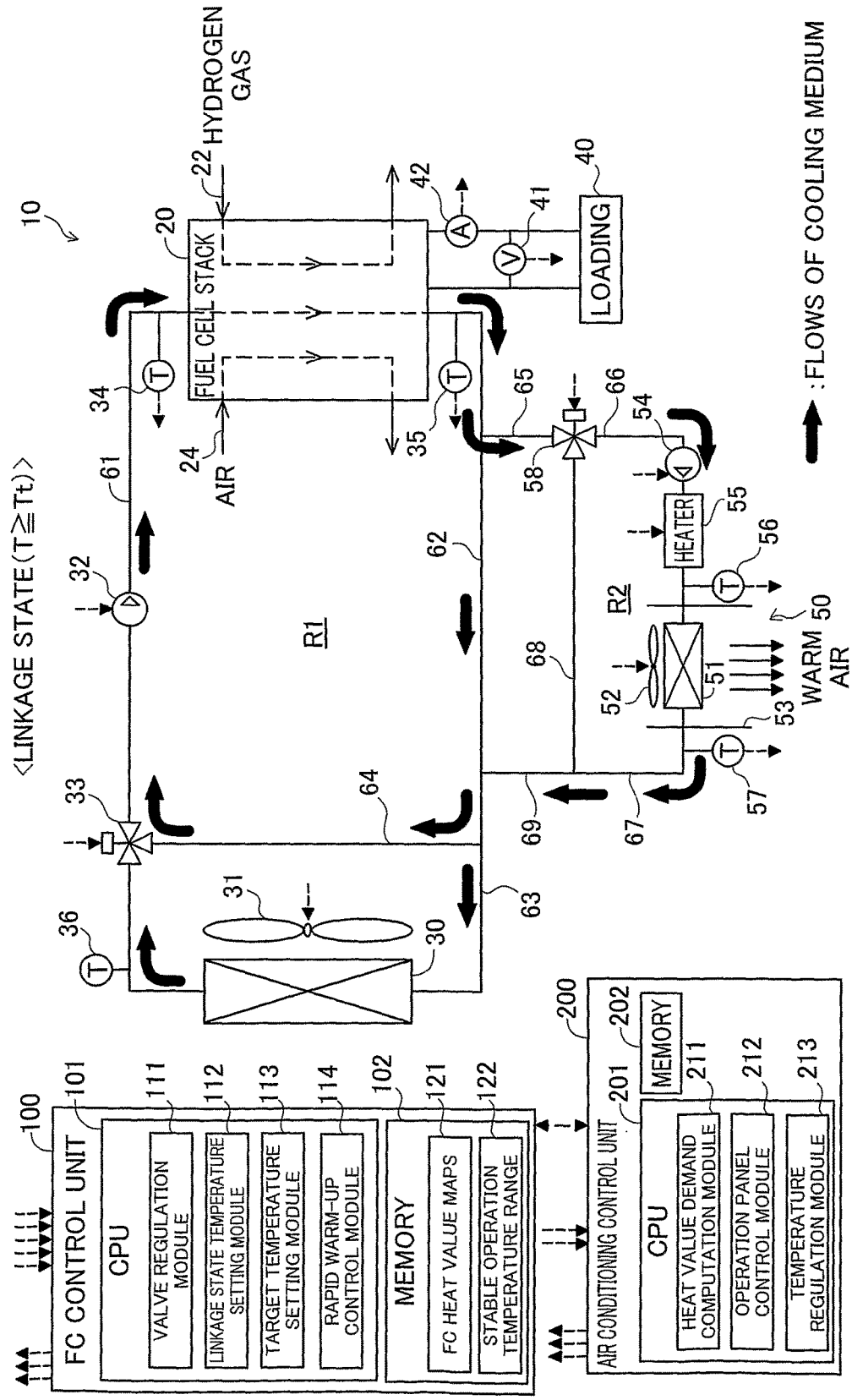
FIG. 9 is a second explanatory view showing the flows of the cooling medium in the vehicle control device set in the linkage state.

FIG. 9 is a second explanatory view showing the flows of the cooling medium in the vehicle control device set in the linkage state. The flows of the cooling medium shown in FIG. 9 are under the condition that the temperature T of the fuel cell stack 20 is not lower than the target temperature Tt.

As shown in FIG. 9, in the linkage state of the vehicle control device 10, when the temperature T of the fuel cell stack 20 is not lower than the target temperature Tt, the cooling medium flows into the third medium flow path 63 and is cooled down by the radiator 30. The flows of the cooling medium in the other medium flow paths in the linkage state of FIG. 9 are identical with those of the cooling medium in the linkage state of FIG. 8. When the flow of the cooling medium out of the fuel cell stack 20 has been cooled down by the radiator 30 and accordingly has the temperature below the target temperature Tt, the flow rate of the cooling medium flowing into the radiator 30 is decreased to increase the temperature of the cooling medium. In this manner, the temperature T of the fuel cell stack 20 (that is, the temperature of the cooling medium flowed into the heater core 51) is controlled to be kept at the target temperature Tt.

In the illustrated example of FIG. 4, in response to the user's heating request after a start of the electric vehicle, the temperature regulation process discussed above is performed to move an operation point of the fuel cell stack 20 defined by the combination of the temperature of and the amount of heat generation by the fuel cell stack 20 rightward along the referred heat value map L2. At an operation point P1, the two medium circuits R1 and R2 are interconnected or linked with each other. With a further movement of the operation point to an operation point P2, the temperature regulation process regulates the opening of the first three-way valve 33 to keep this operation point P2. According to a concrete procedure, in the case where the temperature of the fuel cell stack 20 increases to or over a temperature T4 (Tt) at the operation point P2, the temperature regulation process regulates the opening of the first three-way valve 33 to increase the flow rate of the cooling medium flowing from the second medium flow path 62 to the third medium flow path 63 and to decrease the flow rate of the cooling medium flowing from the second medium flow path 62 to the fourth medium flow path 64. In the case where the temperature of the fuel cell stack 20 decreases below the temperature Tr (Tt) at the operation point P2, on the other hand, the temperature regulation process regulates the opening of the first three-way valve 33 to decrease the flow rate of the cooling medium flowing from the second medium flow path 62 to the third medium flow path 63 and to increase the flow rate of the cooling medium from the second medium flow path 62 to the fourth medium flow path 64.

In the illustrated example of FIG. 5, at an operation point P11, the two medium circuits R1 and R2 are interconnected or linked with each other. The temperature regulation process then regulates the opening of the first three-way valve 33 to keep an operation point P12. In the illustrated example of FIG. 6, at an operation point P21, the two medium circuits R1 and R2 are interconnected or linked with each other. The temperature regulation process then regulates the opening of the first three-way valve 33 to keep an operation point P22.

In the illustrated examples of FIGS. 5 and 6, the flow of the cooling medium having the amount of heat generation or the heat value of not lower than the heat value demand Qr is supplied to the heater core 51. In this case, the temperature regulation module 213 stops the operation of the electric heater 55 and lowers the flow rate of the air blown by the second electric fan 52, so as to decrease the volume of the warm air blown out of the air conditioning mechanism 50. Such decrease of the air volume aims to prevent the vehicle interior temperature from exceeding the user's desired temperature. This temperature control enables the temperature of the cooling medium flowing in the two medium circuits R1 and R2 to be kept in a temperature range exceeding the target temperature Tt. Namely a certain amount of the waste heat of the fuel cell stack 20 corresponding to an excess temperature above the target temperature is accumulated and kept in the flow of the cooling medium in the two medium circuits R1 and R2. In response to the user's subsequent heating request for a higher temperature, the amount of heat accumulated in the flow of the cooling medium is utilized to blow the warm air. This arrangement thus improves the response to the user's heating request and effectively prevents a decrease of the power generation efficiency of the fuel cell stack 20. Instead of lowering the flow rate of the air blown by the second electric fan 52, another available procedure may lower the flow rate of the cooling medium going through the heater core 51, in order to prevent the vehicle interior temperature from exceeding the user's desired temperature.

As described above, the vehicle control device 10 of the embodiment sets the linkage state temperature Tc to the lower limit temperature T1 of the stable operation temperature range Rg0, which is lower than the warm-up termination temperature Te (or the final value of the temperature T of the fuel cell stack 20 attained by the rapid warm-up). Such temperature setting enables the two medium circuits R1 and R2 to be linked or interconnected at an earlier timing at the time of a start of the electric vehicle that requires a specifically large amount of heat to be supplied to the air conditioning mechanism 50. Namely the waste heat of the fuel cell stack 20 can effectively be utilized for heating the heater core 51. This arrangement desirably restricts the use of the electric heater 55 and thereby improves the overall fuel consumption of the vehicle control device 10. The linkage of the two medium circuits R1 and R2 prior to termination of the rapid warm-up effectively prevents the relatively low-temperature flow of the cooling medium circulated in the second medium circuit R2 from flowing into the first medium circuit R1 after termination of the rapid warm-up and damaging the effectiveness of the warm-up. The linkage of the two medium circuits R1 and R2 at this timing also restricts the use of the electric heater 55 for heating the relatively low-temperature flow of the cooling medium.

Setting the lower limit temperature T1 of the stable operation temperature range Rg0 to the linkage state temperature Tc enables the two medium circuits R1 and R2 to be linked and interconnected under a lower temperature condition, while assuring the stability of the output voltage from the fuel cell stack 20. Namely the waste heat of the fuel cell stack 20 can effectively be utilized for heating the heater core 51.

In the state where the below-demand temperature range Rg1 is present in the referred heat value map and the upper limit temperature T4 of the below-demand temperature range Rg1 is lower than the upper limit temperature T2 of the stable operation temperature range Rg0, the temperature setting process of the embodiment sets the upper limit temperature T4 of the below-demand temperature range Tg1 to the target temperature Tt. Such temperature setting enables the fuel cell stack 20 to generate a minimum amount of heat required for satisfying the heat value demand Qr, while assuring the stability of the output voltage from the fuel cell stack 20. The temperature setting thus desirably prevents a greater amount of heat from being generated over the heat value demand Qr. Namely this arrangement effectively minimizes a decrease of the power generation efficiency of the fuel cell stack 20, thus improving the fuel consumption of the fuel cell stack 20. The procedure of this embodiment sets the target temperature Tt to a relatively high temperature (for example, a higher temperature than the lower limit temperature of the below-demand temperature range Rg1 or a higher temperature than the high efficiency temperature range RgS). Compared with a procedure of setting a relatively low temperature (for example, a temperature within the high efficiency temperature range RgS) to the target temperature Tt, the temperature setting procedure of this embodiment desirably controls heat release from the radiator 30. This arrangement assures the effective utilization of the waste heat of the fuel cell stack 20 and improves the overall fuel consumption of the vehicle control device 10.

In the state where the below-demand temperature range Rg10 is present in the referred heat value map and the upper limit temperature T6 of the below-demand temperature range Rg10 is not lower than the upper limit temperature T2 of the stable operation temperature range Rg0 or in the state where no below-demand temperature range is present in the referred heat value map, the temperature setting process of the embodiment sets the upper limit temperature T2 of the stable operation temperature range Rg0 to the target temperature Tt. Such temperature setting assures the stability of the output voltage from the fuel cell stack 20. This temperature setting also enables an excess amount of heat generated over the heat value demand Qr to be accumulated in the flow of the cooling medium in the two medium circuits R1 and R2. The accumulated amount of heat is utilized in response to the user's subsequent heating request for a higher temperature. Compared with an arrangement of discharging (releasing) the excess amount of heat generated over the heat value demand Qr from the radiator 30, this arrangement of the embodiment desirably improves the overall fuel consumption of the vehicle control device 10.

B. Other Aspects

Among the various constituents and components included in the embodiment discussed above, those other than the constituents and components included in independent claims are additional and supplementary elements and may be omitted according to the requirements. The embodiment and its applications discussed above are to be considered in all aspects as illustrative and not restrictive. There may be many modifications, changes, and alterations without departing from the scope or spirit of the main characteristics of the present invention. Some examples of possible modification are given below.

B1. Modified Example 1

The temperature setting process of the above embodiment sets the lower limit temperature T1 of the stable operation temperature range Rg0 to the linkage state temperature Tc. Such temperature setting is, however, neither essential nor restrictive. One modified procedure may set the linkage state temperature Tc to any arbitrary temperature in a temperature range specified according to the durability performance of the fuel cell stack 20. In general, in a working environment with a temperature out of a preset temperature range (generally a narrower temperature range than the stable operation temperature range Rg0), the electrolyte membranes and the catalyst layers in the respective unit cells quickly deteriorate, for example, due to the current crowding effect. Setting the linkage state temperature Tc to any arbitrary temperature that is not lower than a lower limit temperature but is not higher than an upper limit temperature of the temperature range specified according to the durability performance of the fuel cell stack 20 effectively assures the sufficient durability performance of the fuel cell stack 20. This temperature range may be specified in advance based on the results of durability tests and may be stored in the memory 102, in place of the stable operation temperature range 122. The lower limit temperature of the temperature range specified according to the durability performance of the fuel cell stack 20 is generally lower than the warm-up termination temperature Te.

Another modified procedure may set the linkage state temperature Tc to any arbitrary temperature in a specific temperature range that assures the rated output power of the fuel cell stack 20. The fuel cell stack 20 generally has a preset value of the rated output power. In a working environment with an extremely low (or an extremely high) operation temperature, however, the power generation efficiency is lowered to decrease the actual output power of the fuel cell stack 20 below the rated output power. Setting the linkage state temperature Tc to any arbitrary temperature that is not lower than a lower limit temperature but is not higher than an upper limit temperature of the specific temperature range assuring the rated output power of the fuel cell stack 20 desirably prevents the actual output power of the fuel cell stack 20 from decreasing below the rated output power. The specific temperature range may be determined in advance based on the results of tests and may be stored in the memory 102, in place of the stable operation temperature range 122. The lower limit temperature of the specific temperature range assuring the rated output power of the fuel cell stack 20 is generally lower than the warm-up termination temperature Te.

Another modified procedure may set 0° C. to the linkage state temperature Tc. Such temperature setting allows for the linkage of the two medium circuits under a lower temperature condition. In the case of linkage of the two medium circuits at a subzero temperature, the temperature T of the fuel cell stack 20 may decrease below 0° C. after the linkage. There is accordingly a fear that the generated water is frozen in the respective unit cells. Such freezing of water interferes with the smooth supplies of the reactive gases and the smooth discharge of the generated water, thus extremely lowering the power generation efficiency. Setting 0° C. to the linkage state temperature Tc prevents the generated water from being frozen in the respective unit cells after the linkage. The linkage state temperature Tc set equal to 0° C. is generally lower than both the lower limit temperature T1 of the stable operation temperature range Rg0 and the warm-up termination temperature Te.

As clearly understood from the embodiment discussed above and the exemplary procedures of this modified example, any arbitrary temperature that is lower than the warm-up termination temperature Te may be set to the linkage state temperature in the vehicle control device of the invention.

B2. Modified Example 2

The temperature setting process of the above embodiment sets the target temperature Tt to either the upper limit temperature T4 of the below-demand temperature range Rg1 or the upper limit temperature T2 of the stable operation temperature range Rg0. Such temperature setting is, however, neither essential nor restrictive. In the illustrated example of FIG. 4, one modified procedure may set the target temperature Tt to any arbitrary temperature that is higher than the upper limit temperature T4 of the below-demand temperature range Rg1 but is lower than the upper limit temperature T2 of the stable operation temperature range Rg0. In the state where the below-demand temperature range Rg1 is present in the referred heat value map, this modified procedure sets a higher temperature to the target temperature Tt and thereby enables a greater amount of heat to be accumulated in the two medium circuits R1 and R2. This modified arrangement assures a quick response to the user's heating request for a higher temperature and prevents the fuel cell stack 20 from being operated with a low power generation efficiency, thus improving the fuel consumption.

Another modified procedure may set the target temperature Tt to any arbitrary temperature in the high efficiency temperature range RgS. This modified procedure enables a temperature of at the minimum higher than the linkage state temperature Tc to be set to the target temperature Tt and allows for linkage of the two medium circuits R1 and R2 at an earlier timing than the timing of a temperature rise to the target temperature Tt. This modified arrangement thus effectively improves the overall fuel consumption of the vehicle control device 10.

Another modified procedure may set the target temperature Tt to variable temperature, instead of one fixed temperature. For example, the target temperature Tt after the linkage (having the temperature relation of T≥Tc) may be set to be higher than the target temperature Tt before the linkage (having the temperature relation of T<Tc) (for example, by +5° C.).

This modified procedure causes the temperature of the cooling medium to be kept at a higher temperature level after the linkage, thus enabling a greater amount of heat to be accumulated in the flow of the cooling medium. This modified arrangement assures a quick response to the user's heating request for a higher temperature and prevents the fuel cell stack 20 from being operated with a low power generation efficiency, thus improving the fuel consumption. In such modification, it is preferable that the target temperature Tt is set to be not higher than the upper limit temperature T2 of the stable operation temperature range Rg0. This temperature setting assures the output stability of the fuel cell stack 20.

As clearly understood from the embodiment discussed above and the exemplary procedures of this modified example, any arbitrary temperature that is higher than the linkage state temperature Tc but is lower than the upper limit temperature T2 of the stable operation temperature range Rg0 may be set to the target temperature in the vehicle control device of the invention.

B3. Modified Example 3

In the embodiment discussed above, the stable operation temperature range Rg0 is a fixed temperature range, for example, a temperature range of 30° C. to 90° C. The stable operation temperature range Rg0 may be a variable temperature range. For example, the stable operation temperature range Rg0 may be varied according to the humidity of the electrolyte membranes included in the respective unit cells. In an extremely dry condition of the electrolyte membranes or in an extremely wet condition of the electrolyte membranes, a voltage drop may be observed in the respective unit cells even in a temperature condition relatively close to the high efficiency temperature range RgS. In the extremely dry condition of the electrolyte membranes or in the extremely wet condition of the electrolyte membranes, the stable operation temperature range Rg0 may thus be narrowed to be closer to the high efficiency temperature range RgS. Such temperature setting assures the output stability of the whole fuel cell stack 20. The humidity of the electrolyte membranes included in the respective unit cells may be estimated from, for example, the measurement value of the resistance (impedance) of the fuel cell stack 20.

B4. Modified Example 4

In the embodiment discussed above, only the heater core 51 and the electric heater 55 are used as the heat source for heating. A heat pump and another electric heater may additionally be used as the heat source for heating. In one concrete structure, the heat pump and the electric heater may be located between the second electric fan 52 and the heater core 51 or on an opposed side to the second electric fan 52 across the heater core 51 (that is, on the side of blowing the warm air).

B5. Modified Example 5

The procedure of the embodiment discussed above restricts the release of heat from the radiator 30 until the temperature T of the fuel cell stack 20 reaches the target temperature Tt. One modified procedure may allow for the release of heat from the radiator 30 even before the temperature T of the fuel cell stack 20 reaches the target temperature Tt.

B6. Modified Example 6

The procedure of the embodiment discussed above regulates the valve opening of the first three-way valve 33 to keep the temperature T of the fuel cell stack 20 at the target temperature Tt. This method is, however, neither essential nor restrictive for the temperature control. In the state where the temperature T of the fuel cell stack 20 rises to be higher than the target temperature Tt, one modified procedure may release the linkage of the two medium circuits R1 and R2 and causes the radiator 30 to cool down only the flow of the cooling medium in the first medium circuit R1. This modified arrangement decreases the volume of the cooling medium as the object to be cooled down by the radiator 30, thus enabling the temperature T of the fuel cell stack 20 to be rapidly lowered to the target temperature Tt.

B7. Modified Example 7

The procedure of the embodiment discussed above regulates the second three-way valve 58 to physically connect the first medium circuit R1 with the second medium circuit R2. The physical connection makes the linkage of the two medium circuits R1 and R2 and enables the cooling medium to be flowed in and out between the two medium circuits R1 and R2. This structure is, however, neither essential nor restrictive. In one modified configuration, a heat exchange unit may be provided to be connected with both the first medium circuit R1 and the second medium circuit R2. The two medium circuits R1 and R2 may be interconnected (to exchange the heat) via the heat exchange unit. In this modified structure, at least one of the first medium circuit R1 and the second medium circuit R2 may be arranged to have a bypass flow path that bypasses the heat exchange unit. Making the flow of the cooling medium through the bypass flow path forms the independent state. Namely the vehicle control device of the invention may be constructed in general to have the state switchover structure that sets the two medium circuits R1 and R2 either in the independent state or in the linkage state according to any arbitrary method.

B8. Modified Example 8

The vehicle control device 10 of the embodiment is mounted on the electric vehicle. This is, however, neither essential nor restrictive. The vehicle control device may be mounted on any of other diverse moving bodies including hybrid vehicles, boats and ships, and robots. In another modification, the fuel cell stack 20 may be used as a stationary power source, and the vehicle control device 10 may be used as a control device for any of stationary constructions, such as a building or a conventional house.

B9. Modified Example 9

Part of the software configuration in the above embodiment may be replaced with a corresponding hardware configuration. On the contrary, part of the hardware configuration in the above embodiment may be replaced with a corresponding software configuration.

The invention claimed is:

1. A vehicle control apparatus for controlling a vehicle, comprising:
a fuel cell configured to supply electric power to the vehicle; an air conditioning mechanism having a heater core; a first medium circuit configured to make a circulated flow of a cooling medium going through the fuel cell;
a radiator installed in the first medium circuit;
a bypass circuit formed in the first medium circuit to make a bypass flow of the cooling medium bypassing the radiator;
a regulation valve installed in the first medium circuit to regulate a ratio of a flow rate of the cooling medium going through the radiator to a flow rate of the cooling medium going through the bypass circuit;
a second medium circuit configured to make a circulated flow of the cooling medium going through the heater core;
a cooling medium circulation pump installed in at least one of the first medium circuit and the second medium circuit;
a temperature sensor configured to obtain a fuel cell temperature representing a representative temperature of the fuel cell; and
a processor programmed to:
obtain a heat value demand or a required amount of heat generation for the air conditioning mechanism;
obtain an amount of power generation by the fuel cell;
control the regulation valve and adjust a temperature of the cooling medium flowing through the first medium circuit, so as to regulate the fuel cell temperature;
set a target temperature for a regulation of the fuel cell temperature by the temperature regulation module;
identify presence or absence of a below-demand temperature range, which is a specific temperature range of the fuel cell temperature where a heat value or an higher than the heat value demand, and upon identification of the presence, specify the below-demand temperature range, wherein upon identification of the presence of the below-demand temperature range, an upper limit temperature of the specified below-demand temperature range is set to the target temperature;
providing the fuel cell with a heat value map, the heat value map being a concave upward curve and including:
a low temperature range in which the amount of heat generation abruptly increases with a slight temperature decrease,
a high temperature range in which the amount of heat generation abruptly increases with a slight temperature increase, and
a middle temperature range between the high temperature range and the low temperature range, wherein in the middle temperature range, the amount of heat generation gradually decreases with a temperature increase and then gradually increases with a further temperature increase,
set a temperature of a higher temperature-intersection point out of two intersection points of the heat value map and the heat value demand, to the target temperature,
warm up the fuel cell until the fuel cell temperature reaches a warm-up termination temperature to generate a stable voltage,
maintain the first medium circuit and the second medium circuit in an independent state where the first medium circuit and the second medium circuit are disconnected from each other in response to the fuel cell temperature being lower than a linkage state temperature where the fuel cell does not output a stable voltage by closing a three-way valve in the second medium circuit so that the cooling medium of the first medium cannot enter the second medium circuit, the linkage state temperature being lower than the warm-up termination temperature of the fuel cell and corresponding to any one of: (i) a lower limit temperature of a stable operation range of the fuel cell, (ii) a temperature within a temperature range specified according to a durability performance of the fuel cell, (iii) a temperature within a temperature range ensuring a rated output power of the fuel cell, and (iv) 0° Celsius, and
connect the first medium circuit to the second medium circuit by opening the three-way valve in the second medium circuit so that the cooing medium of the first medium circuit can enter the second medium circuit such that the first medium circuit and the second medium circuit are in a linkage state where the cooling medium in the first medium circuit and the second medium circuit mix together in response to the fuel cell temperature being equal to or greater than the linkage state temperature, wherein
the linkage state temperature is not lower than the lower limit temperature of a stable operation temperature range where the fuel cell is operable in a stable condition.

2. A vehicle control apparatus for controlling a vehicle, comprising:
a fuel cell configured to supply electric power to the vehicle;
an air conditioning mechanism having a heater core; a first medium circuit configured to make a circulated flow of a cooling medium going through the fuel cell;
a radiator installed in the first medium circuit;
a bypass circuit formed in the first medium circuit to make a bypass flow of the cooling medium bypassing the radiator;
a regulation valve installed in the first medium circuit to regulate a ratio of a flow rate of the cooling medium going through the radiator to a flow rate of the cooling medium going through the bypass circuit;
a second medium circuit configured to make a circulated flow of the cooling medium going through the heater core;
a cooling medium circulation pump installed in at least one of the first medium circuit and the second medium circuit;
a temperature sensor configured to obtain a fuel cell temperature representing a representative temperature of the fuel cell; and a processor programmed to:

obtain a heat value demand or a required amount of heat generation for the air conditioning mechanism;

obtain an amount of power generation by the fuel cell;

control the regulation valve and adjust a temperature of the cooling medium flowing through the first medium circuit, so as to regulate the fuel cell temperature;

set a target temperature for regulation of the fuel cell temperature by the temperature regulation module;

identify presence or absence of a below-demand temperature range, which is a specific temperature range of the fuel cell temperature where a heat value or an amount of heat generation by the fuel cell at the obtained amount of power generation is not higher than the heat value demand, and upon identification of the presence, specify the below-demand temperature range, wherein upon identification of the presence of the below-demand temperature range, an upper limit temperature of the specified below-demand temperature range is set to the target temperature;

providing the fuel cell with a heat value map, the heat value map being a concave upward curve and including:

a low temperature range in which the amount of heat generation abruptly increases with a slight temperature decrease, a high temperature range in which the amount of heat generation abruptly increases with a slight temperature increase, and a middle temperature range between the high temperature range and the low temperature range, wherein in the middle temperature range, the amount of heat generation gradually decreases with a temperature increase and then gradually increases with a further temperature increase, set a temperature of a higher temperature-intersection point out of two intersection points of the heat value map and the heat value demand, to the target temperature, warm up the fuel cell until the fuel cell temperature reaches a warm-up termination temperature to generate a stable voltage, maintain the first medium circuit and the second medium circuit in an independent state where the first medium circuit and the second medium circuit are disconnected from each other in response to the fuel cell temperature being lower than a linkage state temperature where the fuel cell does not output a stable voltage by closing a three-way valve in the second medium circuit so that the cooling medium of the first medium cannot enter the second medium circuit, the linkage state temperature being lower than the warm-up termination temperature of the fuel cell and corresponding to any one of: (i) a lower limit temperature of a stable operation range of the fuel cell, (ii) a temperature within a temperature range specified according to a durability performance of the fuel cell, (iii) a temperature within a temperature range ensuring a rated output power of the fuel cell, and (iv) 0° Celsius, and connect the first medium circuit to the second medium circuit by opening the three-way valve in the second medium circuit so that the cooing medium of the first medium circuit can enter the second medium circuit such that the first medium circuit and the second medium circuit are in a linkage state where the cooling medium in the first medium circuit and the second medium circuit mix together in response to the fuel cell temperature being equal to or greater than the linkage state temperature, wherein the linkage state temperature is not lower than the lower limit temperature of a durable temperature range where the fuel cell maintains a predetermined durability performance.

3. The vehicle control apparatus in accordance with claim 1, wherein the linkage state temperature is not lower than 0° C.

4. The vehicle control apparatus in accordance with claim 1, wherein when the upper limit temperature of the below-demand temperature range is higher than an upper limit temperature of a stable operation temperature range where the fuel cell is operable in a stable condition, the processor sets the upper limit temperature of the stable operation temperature range to the target temperature, in place of the upper limit temperature of the below-demand temperature range.

5. The vehicle control apparatus in accordance with claim 1, wherein upon identification of the absence of the below-demand temperature range by the processor, the processor sets an upper limit temperature of a stable operation temperature range where the fuel cell is operable in a stable condition, to the target temperature.

6. The vehicle control apparatus in accordance with claim 1, wherein the processor restricts heat release during a rise of the fuel cell temperature until the fuel cell temperature reaches the target temperature.

7. The vehicle control apparatus in accordance with claim 1, wherein the fuel cell in the stable condition represents a state of the fuel cell having no extreme drop of at least one cell voltage.

8. The vehicle control apparatus in accordance with claim 2, wherein the fuel cell operating in the predetermined durability performance represents a state of the fuel cell having no extreme drop of at least one cell voltage.

* * * * *